US010324663B2

United States Patent
Buzzard et al.

(10) Patent No.: US 10,324,663 B2
(45) Date of Patent: Jun. 18, 2019

(54) CLUSTER CONFIGURATION INFORMATION REPLICATION

(71) Applicant: NetApp Inc., Sunnyvale, CA (US)

(72) Inventors: Gregory Buzzard, Pittsburgh, PA (US); Justin Travis Cady, Cranberry Township, PA (US); Thomas Gilbert Snyder, Apollo, PA (US); Satya R. Venneti, Pittsburgh, PA (US); Sakir Yucel, Wexford, PA (US)

(73) Assignee: NetApp Inc., Sunnyvale, CA (US)

(*) Notice: Subject to any disclaimer, the term of this patent is extended or adjusted under 35 U.S.C. 154(b) by 0 days.

(21) Appl. No.: 15/820,910

(22) Filed: Nov. 22, 2017

(65) Prior Publication Data

US 2018/0095671 A1    Apr. 5, 2018

Related U.S. Application Data

(63) Continuation of application No. 15/661,055, filed on Jul. 27, 2017, now Pat. No. 9,836,249, which is a
(Continued)

(51) Int. Cl.
G06F 12/00 (2006.01)
G06F 13/00 (2006.01)
G06F 3/06 (2006.01)

(52) U.S. Cl.
CPC ............ G06F 3/067 (2013.01); G06F 3/0617 (2013.01); G06F 3/0629 (2013.01)

(58) Field of Classification Search
None
See application file for complete search history.

(56) References Cited

U.S. PATENT DOCUMENTS

| 7,529,762 B2 * | 5/2009 | Casati | G06Q 10/06 |
| | | | 705/301 |
| 9,032,160 B1 * | 5/2015 | Natanzon | G06F 11/14 |
| | | | 711/135 |

(Continued)

OTHER PUBLICATIONS

Non-Final Office Action cited in U.S. Appl. No. 14/491,879 dated Mar. 10, 2016, 21 pgs.

(Continued)

*Primary Examiner* — Sean D Rossiter
(74) *Attorney, Agent, or Firm* — Cooper Legal Group, LLC

(57) ABSTRACT

One or more techniques and/or systems are provided for cluster configuration information replication, managing cluster-wide service agents, and/or for cluster-wide outage detection. In an example of cluster configuration information replication, a replication workflow corresponding to a storage operation implemented for a storage object (e.g., renaming of a volume) of a first cluster may be transferred to a second storage cluster for selectively implementation. In an example of managing cluster-wide service agents, cluster-wide service agents are deployed to nodes of a cluster storage environment, where a master agent actively processes cluster service calls and standby agents passively wait for reassignment as a failover master in the event the master agent fails. In an example of cluster-wide outage detection, a cluster-wide outage may be determined for a cluster storage environment based upon a number of inaccessible nodes satisfying a cluster outage detection metric.

20 Claims, 18 Drawing Sheets

Related U.S. Application Data continuation of application No. 14/491,879, filed on Sep. 19, 2014, now Pat. No. 9,720,626.

(56) References Cited

U.S. PATENT DOCUMENTS

| | | | | |
|---|---|---|---|---|
| 2010/0011037 A1* | 1/2010 | Kazar | ............... | G06F 3/0605 |
| | | | | 707/E17.01 |
| 2015/0213032 A1* | 7/2015 | Powell | ............. | G06F 17/30079 |
| | | | | 707/827 |
| 2016/0085606 A1* | 3/2016 | Panasko | ............... | G06F 11/079 |
| | | | | 714/37 |
| 2017/0262172 A1* | 9/2017 | Xu | ........................ | G06F 3/061 |

OTHER PUBLICATIONS

Reply Non-Final Office Action cited in U.S. Appl. No. 14/491,879 dated Jun. 10, 2016, 9 pgs.
Final Office Action cited in U.S. Appl. No. 14/491,879 dated Dec. 19, 2016, 18 pgs.
Reply Final Office Action cited in U.S. Appl. No. 14/491,879 dated Feb. 20, 2017, 38 pgs.
Advisory Action cited in U.S. Appl. No. 14/491,879 dated Mar. 1, 2017, 2 pgs.
Notice of Allowance cited in U.S. Appl. No. 14/491,879 dated Mar. 31, 2017, 11 pgs.
Amendment after Notice of Allowance cited in U.S. Appl. No. 14/491,879 dated Jun. 20, 2017, 9 pgs.
Notice of Allowance cited in U.S. Appl. No. 15/661,055 dated Sep. 1, 2017, 11 pgs.
Amendment after Notice of Allowance cited in U.S. Appl. No. 15/661,055 dated Oct. 27, 2017, 9 pgs.

* cited by examiner

CLUSTER CONFIGURATION INFORMATION REPLICATION

RELATED APPLICATIONS

This application claims priority to and is a continuation of U.S. application Ser. No. 15/661,055, filed on Jul. 27, 2017, now allowed, titled "CLUSTER CONFIGURATION INFORMATION REPLICATION," and claims priority to U.S. Pat. No. 9,720,626, filed on Sep. 19, 2014, titled "CLUSTER CONFIGURATION INFORMATION REPLICATION," which are incorporated herein by reference.

BACKGROUND

A cluster storage environment may comprise one or more storage clusters. A storage cluster may comprise one or more nodes. A node may be configured to provide client devices with access to user data stored on storage devices. Nodes may be configured according to various policies, such as a high availability policy where two nodes are paired together such that a primary node actively services client I/O requests and a secondary node passively waits to provide failover recovery operation on behalf of the primary node in the event the primary node experiences a failure. Various issues, such as an inability for clients to access user data, may arise when information is not reliably replicated between nodes and/or storage clusters, when cluster-wide outages are not detected, and/or when failover operation is not implemented in an efficient manner.

DETAILED DESCRIPTION

Figure 1:
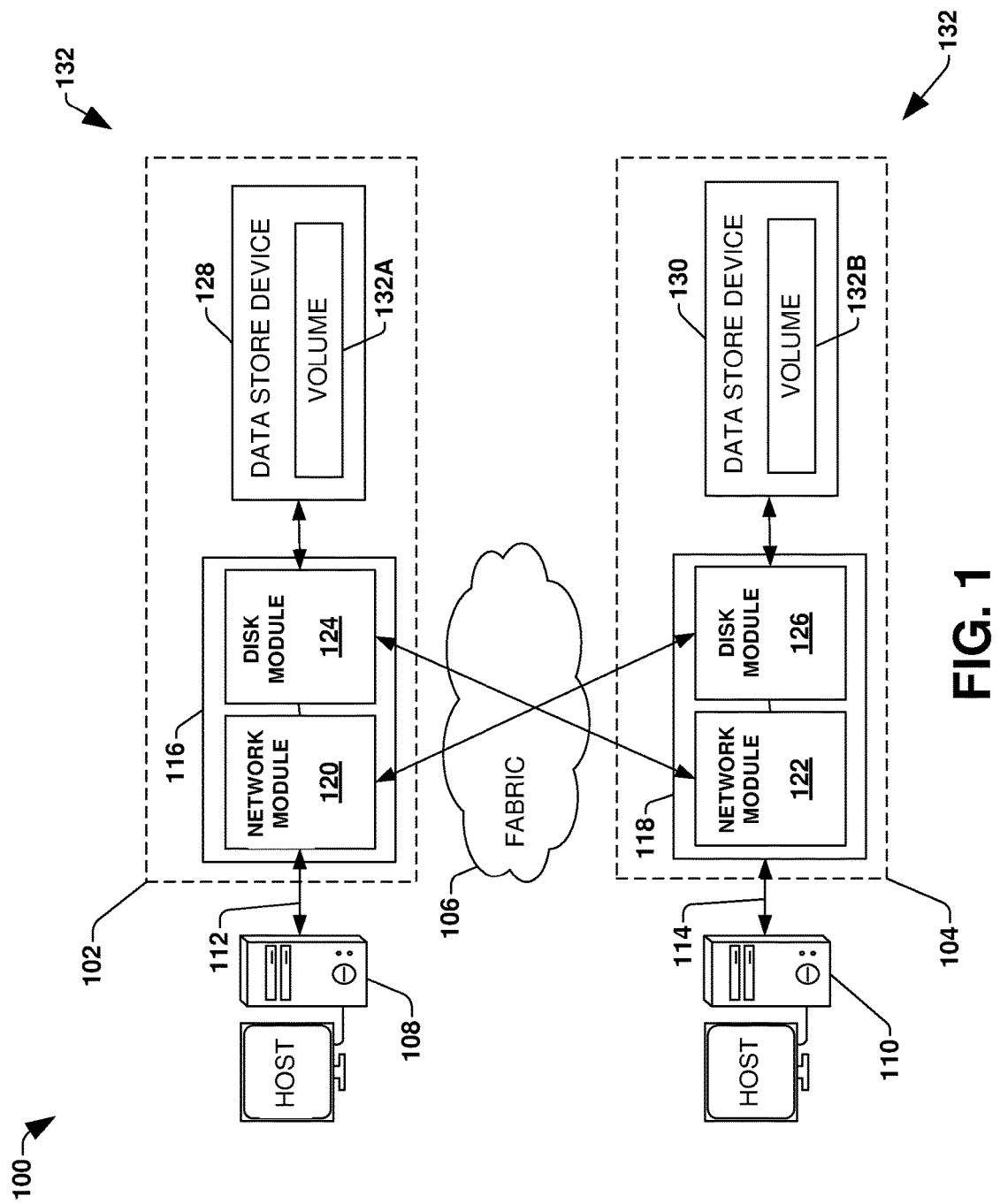
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for cluster configuration information replication, for managing cluster-wide service agents, and/or for cluster-wide outage detection are provided herein.

In an example of cluster configuration information replication, a cluster configuration schema may be defined for storage objects, of a first storage cluster, that are to be actively monitored to changes resulting from storage operations (e.g., a name change operation for a first volume; a resize operation, but not a name change operation, for a second volume; a modification to a storage policy; etc.). Responsive to determining that a storage operation was implemented for a storage object as defined by the cluster configuration schema, a replication workflow may be created for the storage object based upon a change to the storage object by the storage operation (e.g., a new name for the first volume). The replication workflow may comprise storage cluster configuration data that may be used by a second storage cluster to implement the replication workflow for replication of the storage operation from the first storage cluster to the second storage cluster (e.g., a name of a replicated first volume, corresponding to a replication of the first volume, at the second storage cluster may be changed based upon the new name of the first volume). Because merely those storage objects and storage operations that are defined by the cluster configuration schema are evaluated for replication, the efficiency of cluster configuration information replication may be improved (e.g., as opposed to blindly replicating all storage objects and storage operations) to increase speed, conserve memory, reduce processor load, reduce network bandwidth, etc. The second storage cluster may selectively implement the replication workflow and/or may transform some the replication workflow (e.g., a prefix may be appended to the new name before being applied to the replicated volume).

In an example of managing cluster-wide service agents, cluster-wide service agents are deployed to nodes within a cluster storage environment. A cluster-wide service agent may be assigned as a master agent that is configured to actively process cluster service calls (e.g., API calls to a set of storage cluster services, such as a replication cluster service, a storage policy cluster service, a volume creation cluster service, etc.). The remaining cluster-wide service agents may be assigned as standby agents that may be configured to passively wait for reassignment as failover master agent (e.g., a reassignment from being a standby agent to being a new master agent due to a failure of a previous master agent). Because less than all cluster-wide service agents are designated as the master agent (e.g., merely a single cluster-wide service agent), a single interface point may be provided for accessing cluster services, which may mitigate processing and memory resources otherwise designated for load balancing. Because a standby agent may be quickly reassigned as a failover master in the event a master agent fails (e.g., a master agent crashes or is responding below an acceptable latency threshold), high availability of cluster services is provided.

In an example of cluster-wide outage detection, a cluster outage detection metric for a cluster storage environment, comprising plurality of nodes, may be defined. For example, the cluster outage detection metric may specify that a cluster-wide outage occurs when a majority of nodes are inaccessible, otherwise merely a service level outage of a service or application may have occurred. In this way, operational information of the plurality nodes may be evaluated to determine whether the cluster outage detection metric is satisfied, and thus a cluster-wide outage is determined for the cluster storage environment. Various decisions may be made based upon the cluster-wide outage, such as whether a primary virtual server is to be retained in a down state or is to be brought online. In this way, appropriate actions may be taken in the event of a cluster-wide outage (e.g., a synchronization action with a failover cluster that provide failover operation during the cluster-wide outage, a recovery action, a policy change action, etc.) so that the cluster storage environment may become operational and/or stabilized efficiently and/or sooner so that users may regain access to user data and/or cluster services.

To provide context for cluster configuration information replication, managing cluster-wide service agents, and/or cluster-wide outage detection, FIG. 1 illustrates an embodiment of a clustered network environment (e.g., a clustered storage environment, a storage cluster, etc.) or a network storage environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 (e.g., a clustered storage environment, a storage cluster, etc.) that may implement at least some embodiments of the techniques and/or systems described herein. The example environment 100 comprises data storage systems or storage sites 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a disk module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of Network and Disk modules, other embodiments may comprise a differing number of these modules. For example, there may be a plurality of Network and/or Disk modules interconnected in a cluster that does not have a one-to-one correspondence between the Network and Disk modules. That is, different nodes can have a different number of Network and Disk modules, and the same node can have a different number of Network modules than Disk modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the disk module 126, thereby accessing volume 132B associated with the data storage device 130.

It may be appreciated that cluster configuration information replication, managing cluster-wide service agents, and/or cluster-wide outage detection may be implemented within the clustered network environment 100 (e.g., a clustered storage environment, a storage cluster, etc.). For example, a replication component, an agent management component, and/or an outage detection component may be implemented for the node 116 and/or the node 118. In this way, cluster configuration data may be replicated between the node 116, the node 118, and/or other nodes of storage clusters not illustrated; cluster-wide service agents may be deployed on the node 116 and/or the node 118; and/or a cluster-wide outage may be determined based upon inaccessibility of the node 116 and/or the node 118.

Figure 2:
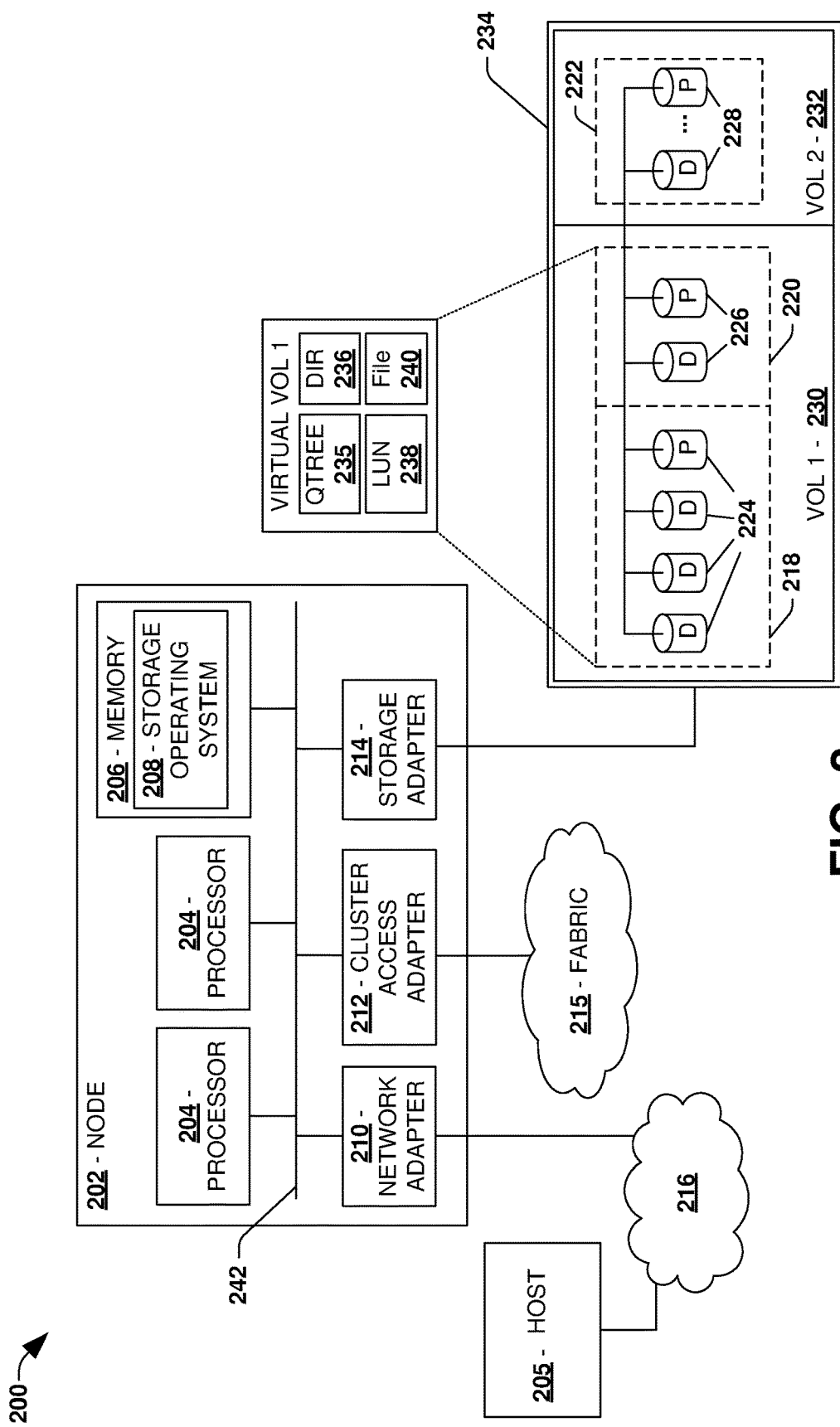
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that cluster configuration information replication, managing cluster-wide service agents, and/or cluster-wide outage detection may be implemented for the data storage system 200 (e.g., a data storage system within a clustered storage environment, a storage cluster, etc.). For example, a replication component, an agent management component, and/or an outage detection component may be implemented for the 202. In this way, cluster configuration data may be replicated between the node 202 and/or other nodes of storage clusters not illustrated; a cluster-wide service agent may be deployed on the node 202; and/or a cluster-wide outage may be determined based upon inaccessibility of the node 202 and/or other nodes not illustrated.

Figure 3:
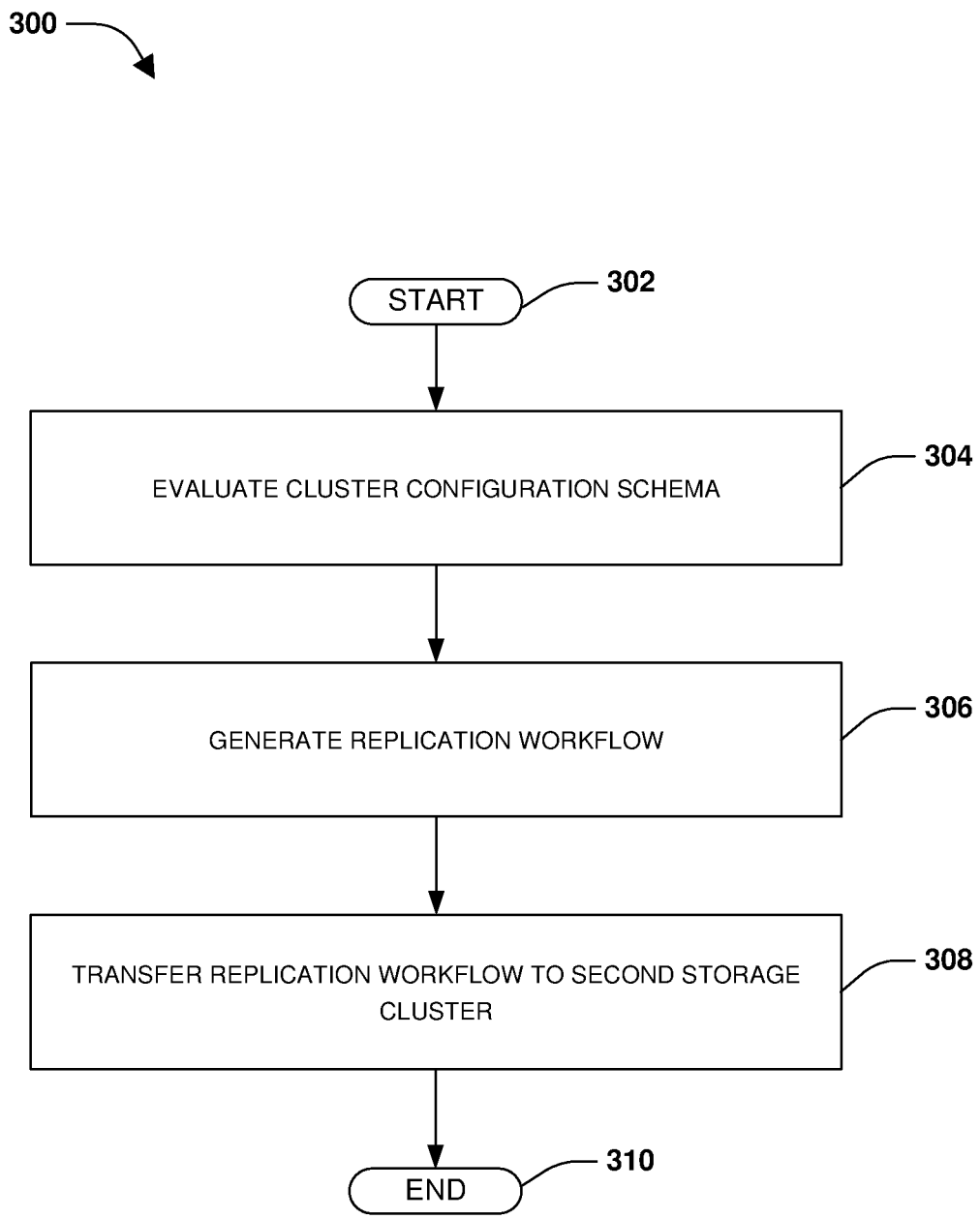
FIG. 3 is a flow chart illustrating an exemplary method of cluster configuration information replication.

One embodiment of cluster configuration information replication is illustrated by an exemplary method 300 of FIG. 3. A cluster storage environment may comprise one or more storage clusters. A storage cluster may comprise a plurality of nodes (e.g., storage controllers) that manage storage (e.g., provide clients with access to user data; implement backup policies; allocate new storage volumes; etc.), which may involve user data (e.g., a text file stored by a client on a storage device) and cluster configuration information (e.g., a size of a storage object, a name of a storage object, a location or directory comprising a storage object, a path used to access user data, a replication policy, a backup policy, an IP address of a storage object, a junction path, an internal configuration of a storage controller, etc.). A storage object may comprise a LUN, a volume, a vserver, a snapshot policy, a storage aggregate, and/or other cluster configuration information.

A cluster configuration schema may define semantics of storage objects and/or storage operations of a first storage cluster, such that a replication component and/or a second storage cluster may use the cluster configuration schema to gain an understanding about the semantics of cluster configuration information of the first storage cluster. For example, the second storage cluster may use the semantics to perform a transformation upon volume cluster configuration information of a volume that is being replicated from the first storage cluster to the second storage cluster (e.g., the second storage cluster may apply a new name, a new IP address, and a new storage directory to replicated volume cluster configuration information that may be relevant to the second storage cluster, as opposed to using names, IP address, and/or storage directory information that may otherwise be relevant to merely the first storage cluster).

The cluster configuration scheme may comprise a hierarchical collection of storage objects and storage operations (e.g., storage operations that are available to perform upon the storage objects, which will result in a change to the cluster configuration information of the first storage cluster). The cluster configuration schema may specify a set of object characteristics and/or a set of storage operations that are to be captured for inclusion within a replication workflow that is to be replicated from the first storage cluster to the second storage cluster (e.g., a name change for a LUN (C); a resize operation for a volume (A); a write operation to a volume (B); etc.). Object characteristics, storage operations, and/or storage objects that are not specified by the cluster configuration schema may be disqualified for inclusion within the replication workflow (e.g., a write operation to the volume (A); a backup operation for a LUN (D); etc.). In this way, merely object characteristics, storage operations, and/or storage objects specified by the cluster configuration schema may be replicated.

At 302, the method starts. At 304, the cluster configuration schema may be evaluated to identify a first storage object, of the first storage cluster, that is to be actively monitored for change (e.g., a change resulting in a change of cluster configuration information) resulting from a first storage operation. For example, the volume (A) may be monitored for a change resulting from a resize operation. At 306, responsive to determining that the first storage operation was implemented for the first storage object, a replication workflow for the first storage object may be generated based upon a change to the first storage object by the first storage operation (e.g., the volume (A) may be resized based upon the resize operation). The replication workflow may comprise the first storage operation (e.g., a description of the resize operation), an input for the first storage operation (e.g., a target new size for the volume (A)), and a result of the first storage operation (e.g., a resulting new size for the volume (A)). In an example where volume (A) was previously replicated from the first storage cluster to the second storage cluster as a replicated volume (A), the replication workflow may comprise an update workflow for the replicated volume (A). In an example where the replication workflow is associated with a set of storage objects, the replication workflow may comprise a baseline workflow for the set of storage objects (e.g., an initial baseline replication of volume (A), volume (B), volume (C), LUN (A), LUN (B), LUN (C), and/or other storage objects that are to be initially replicated/baselined to the second storage cluster, such that subsequent changes to the storage objects may be updated through update workflows).

In an example, a second storage operation that was implemented for a second storage object may be identified (e.g., a storage controller (C) may be reconfigured). Responsive to the cluster configuration scheme not defining the second storage object as being actively monitored for change by the second storage operation, the second storage operation may be disqualified for inclusion within the replication workflow (e.g., the storage controller (C) may not be monitored for reconfiguration changes). In an example, a third storage operation that was implemented for a first storage object may be identified (e.g., a write operation to the volume (A)). Responsive to the cluster configuration scheme not defining the first storage object as being actively monitored for change by the third storage operation, the third storage operation may be disqualified for inclusion within the replication workflow (e.g., the volume (A) may be monitored for resizing but not for write operations).

In an example, the cluster configuration schema may define a replication domain as comprising the first storage object and a fourth storage object. Responsive to determining that a fourth storage operation was implemented for the fourth storage object, the fourth storage operation may be included within the replication workflow. A storage operation replay order may be defined for the first storage operation and the fourth storage operation. The storage operation replay order may be included within the replication workflow so that the second storage cluster may maintain a desired replication replay order when replaying storage operations from the replication workflow.

At 308, the replication workflow may be transferred to the second storage cluster for selective implementation of the replication workflow. In an example, the monitoring of the first storage object, the generation of the replication workflow, the transfer of the replication workflow, and/or the selective implementation of the replication workflow may be performed in real-time so that the second storage cluster may be kept up-to-date with respect to the first storage cluster. In an example, a transformation upon the replication workflow may be facilitated to modify a characteristic of the first storage operation to create a transformed replication workflow for selective implementation by the second storage cluster. The transformation may comprise a volume name change, a volume size change, an IP address change, a name change, a destination location change, a policy change, a junction path change, a storage object property change, and/or any other cluster configuration information change. For example, the second storage cluster may transform the resize storage operation to target a replicated volume (A) IP address of the replicated volume (A) of the second storage cluster, as opposed to an IP address of the volume (A). In another example, the resize storage operation may be transformed to target a replicated volume (A) name, of the replicate volume (A), that may be different than a volume (A) name of the volume (A) of the first storage cluster.

In an example, the replication workflow may comprise a set of storage information associated with a set of storage objects (e.g., the volume (A), a volume (F), a LUN (F), etc.) and/or a set of storage operations (e.g., the resize operation for the volume (A), a write operation to the volume (F), a backup operation for the LUN (F), etc.). A selective implementation of a first portion of the set of storage information, but not a second portion of the set of storage information, by the second storage cluster may be facilitated. For example, the second storage cluster may have an interest in the volume (A) and the volume (F), but not the LUN (F).

In an example, a disaster associated with the first storage cluster may be identified. Responsive to the disaster, the second storage cluster may be invoked to operate according to a disaster recovery mode in place of the first storage cluster based upon the selective implementation of the replication workflow (e.g., the second storage cluster may provide clients with access to replicated user data stored by the second storage cluster). A switchback replication workflow may be generated based upon the second storage cluster operating according to the disaster recovery mode (e.g., a client may modify a name of the volume (A) and may perform various write operations to a volume (G)). The switchback replication workflow may be transferred to the first storage cluster for switchback operation from the second storage cluster to the first storage cluster upon disaster recovery of the first storage cluster (e.g., once recovered, the first storage cluster may be synchronized using the switchback replication workflow so that the first storage cluster may comprise up-to-date information resulting for operations performed by the second storage cluster while in the disaster recovery mode. In this way, cluster configuration information may be selectively replicated and/or transformed between the first storage cluster and the second storage cluster. At 310, the method ends.

Figure 4A:
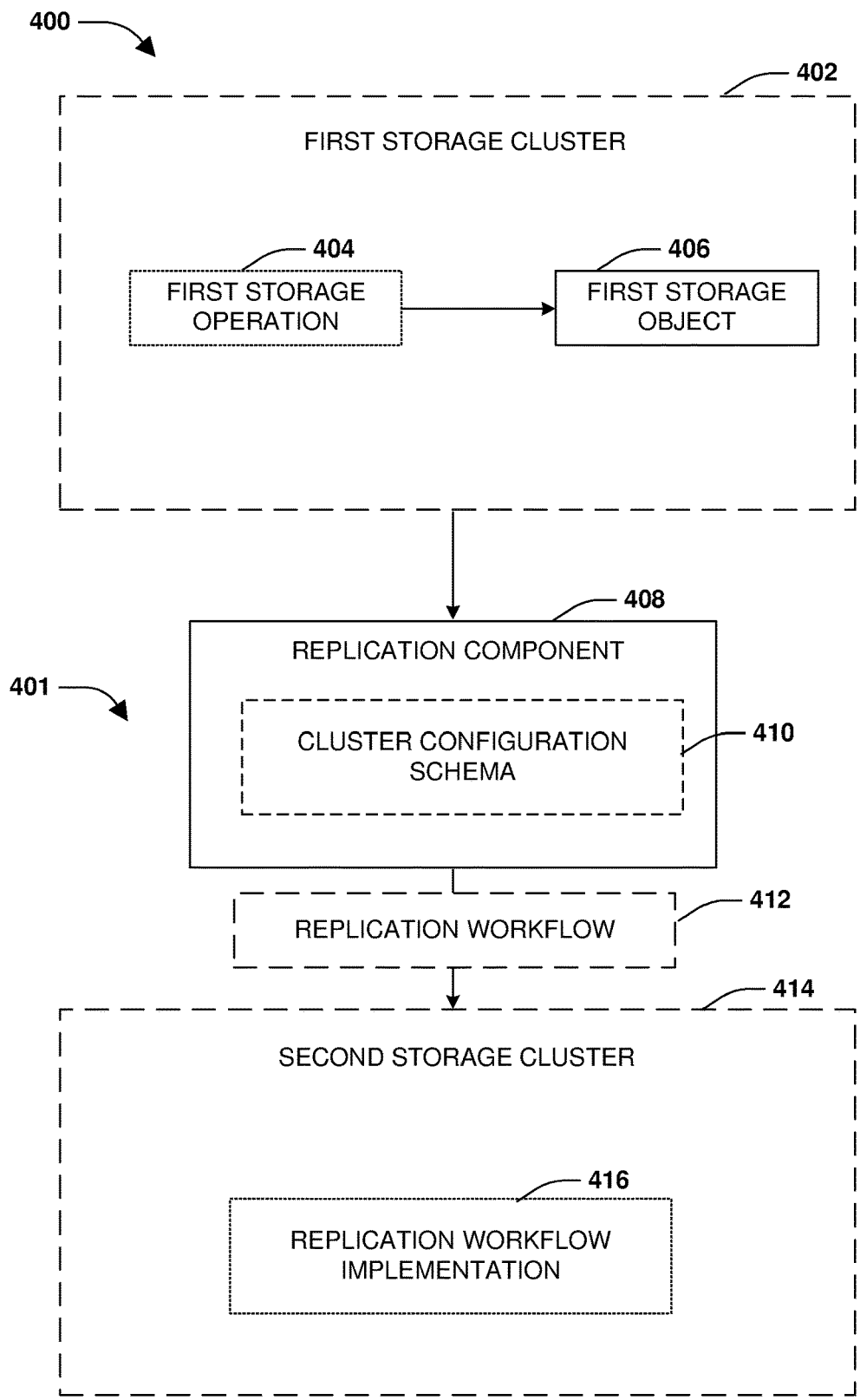
FIG. 4A is a component block diagram illustrating an exemplary system for cluster configuration information replication using a first replication workflow.

FIGS. 4A-4D illustrate examples of a system 401, comprising a replication component 408, for cluster configuration information replication. FIG. 4A illustrates an example 400 of the replication component 408 being associated with a first storage cluster 402 and a second storage cluster 414 (e.g., the replication component 408 may be hosted on a first node within the first storage cluster 402, hosted on a second node within the second storage cluster 414, or hosted on a remote node that is not within the first storage cluster 402 or the second storage cluster 414). The replication component 408 may maintain a cluster configuration schema 410 defining storage objects and/or storage operations that are to be monitored for changes that result in cluster configuration information changes. For example, the cluster configuration schema 410 may specify that a first storage object 406 (e.g., a snapshot policy) is to be monitored for change resulting from a first storage operation 404 (e.g., a snapshot interval change for the snapshot policy).

Responsive to determining that the first storage operation 404 was implemented for the first storage object 406, a replication workflow 412 may be generated for the first storage object 406 based upon a change to the first storage object 406 by the first storage operation 404. The replication workflow 412 may comprise the first storage operation 404 (e.g., the snapshot interval change), an input for the first storage operation 404 (e.g., a snapshot interval increase amount), and a result of the first storage operation 404 (e.g., a new snapshot interval). The replication workflow 412 may be transferred to the second storage cluster 414 for selective implementation 416 by the second storage cluster 414. For example, the second storage cluster 414 may determine when and how to implement 416 the replication workflow 412 (e.g., a time at which to perform the first storage operation 404 upon a replicated snapshot policy maintained by the second storage cluster 414; the snapshot interval increase amount may be transformed, such as decreased, to create a transformed snapshot interval increase amount that is to be used for implementing 416 the replication workflow 412 upon the replicated snapshot policy; etc.).

Figure 4B:
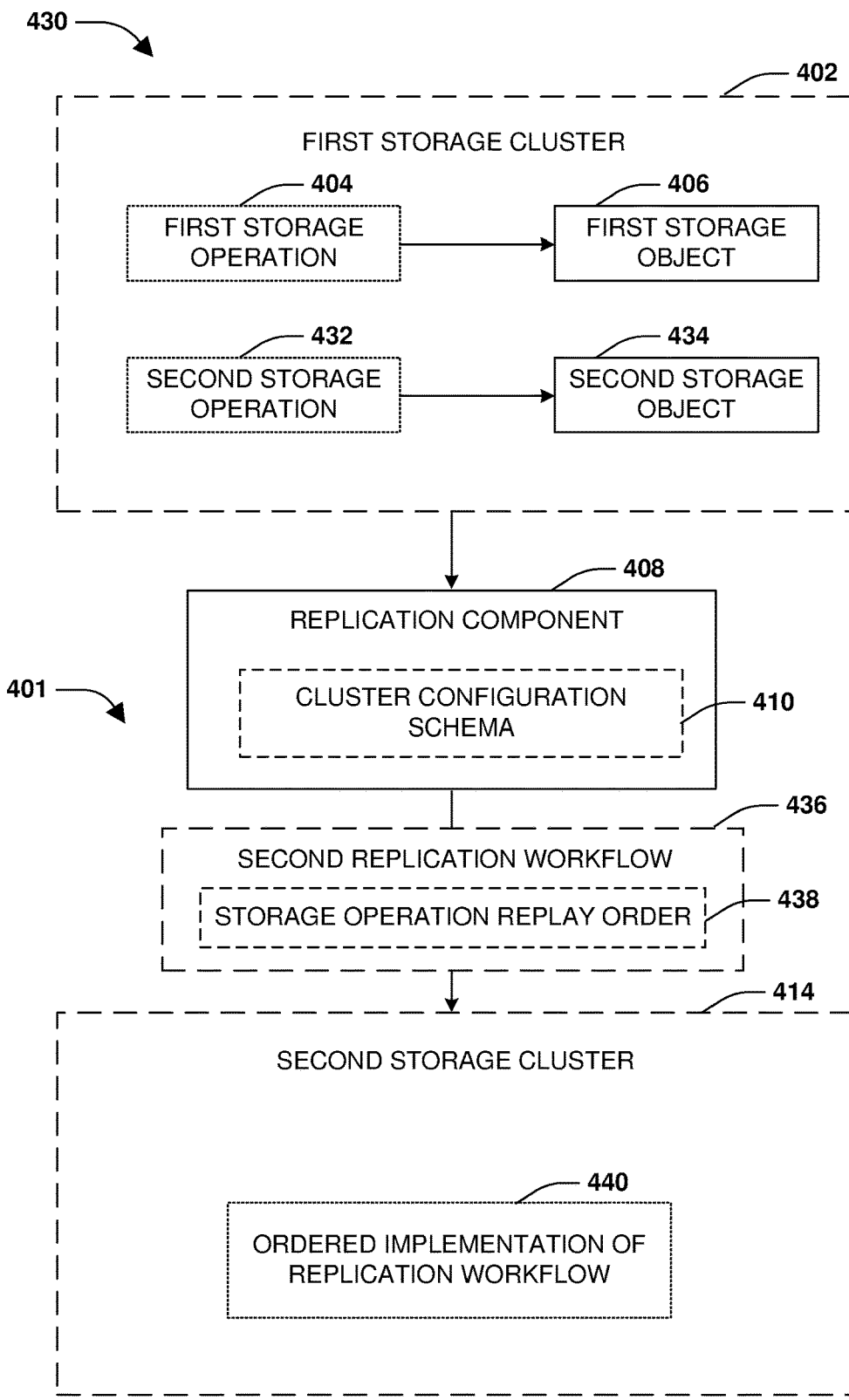
FIG. 4B is a component block diagram illustrating an exemplary system for cluster configuration information replication using a second replication workflow.

FIG. 4B illustrates an example 430 of the replication component 408 generating a second replication workflow 436. For example, the cluster configuration schema 410 may specify that a second storage object 434 (e.g., a storage aggregate for which the snapshot policy may be enforced) is to be monitored for change by a second storage operation 432 (e.g., a rename storage aggregate operation for the storage aggregate). Responsive to the first storage operation 404 being performed on the first storage object 406 and the second storage operation 432 being performed on the second storage object 434, the replication component 408 may generate the second replication workflow 436 for the first storage operation 404 and the second storage operation 432. The replication component 408 may define a storage operation replay order 438 for the first storage operation 404 and the second storage operation 432 (e.g., the name of the storage aggregate may be changed before the snapshot policy is modified so that a new name of the storage aggregate can be applied to the modified snapshot policy). The storage operation replay order 438 may be included in the second replication workflow 436, and the second replication workflow 436 may be transferred for the second storage cluster 414 for implementation 440 according to the storage operation replay order 438. For example, the second storage operation 432 may be applied to a replicated storage aggregate of the second storage cluster 414, and then the first storage operation 404 may be applied to the replicated backup policy of the second storage cluster 414. In an example where the second storage cluster 414 transforms the second replication workflow 436, the second storage cluster may transform the second storage operation 432 by appending a prefix to the new name that is to be applied to the replicated storage aggregate.

Figure 4C:
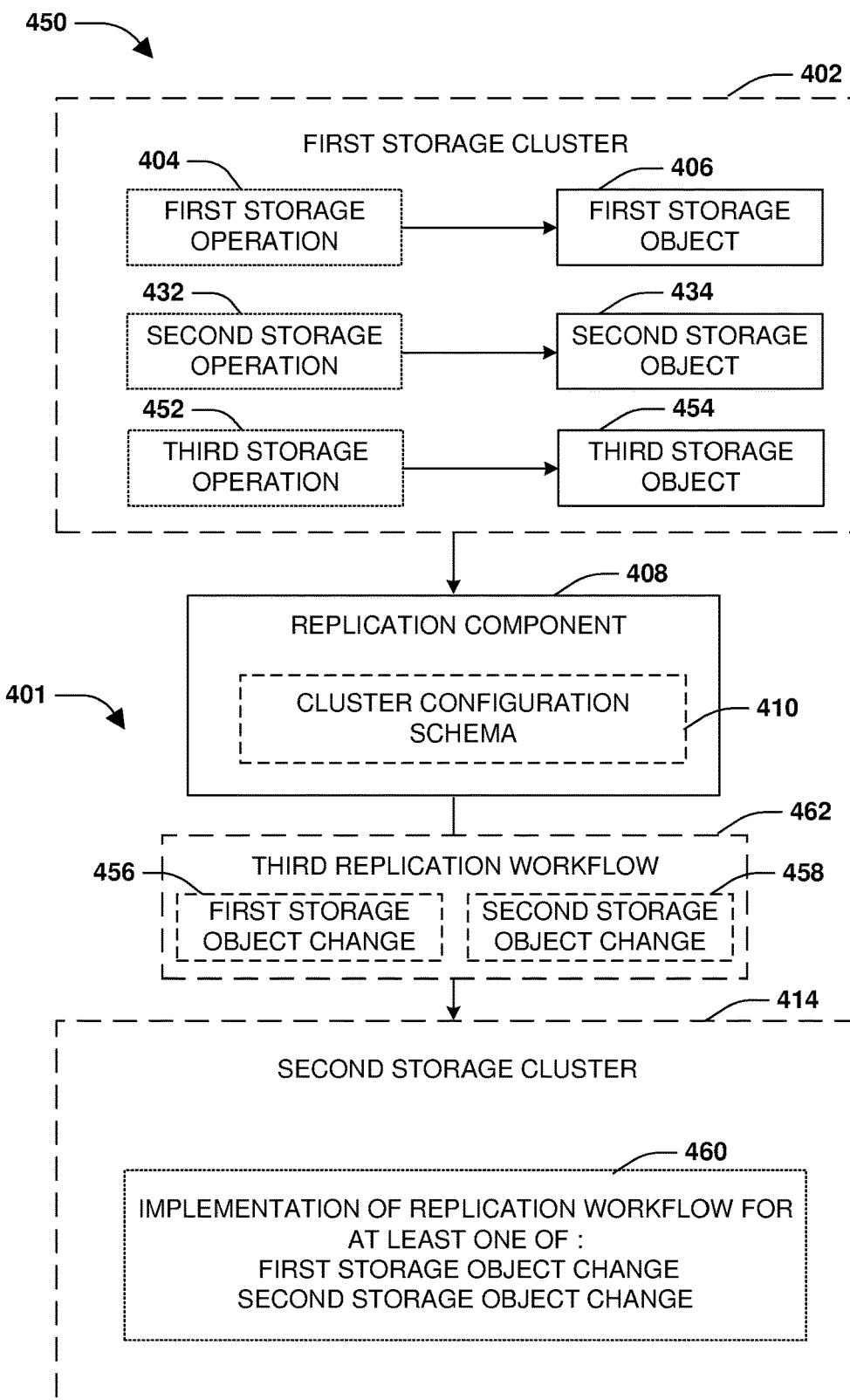
FIG. 4C is a component block diagram illustrating an exemplary system for cluster configuration information replication using a third replication workflow.

FIG. 4C illustrates an example 450 of the replication component 408 generating a third replication workflow 462. The cluster configuration schema 410 may not identify a third storage object 454 for monitoring for changes by a third storage operation 452. Responsive to the first storage operation 404 being performed on the first storage object 406, the second storage operation 432 being performed on the second storage object 434, and the third storage operation 452 being performed on the third storage object 454, the replication component 408 may generate the third replication workflow 462 for the first storage operation 404 and the second storage operation 452 but not the third storage operation 452 (e.g., the replication component 408 may disqualify the third storage operation 452 based upon the cluster configuration schema 410). For example, the replication component 408 may include a first storage object change 456 of the first storage object 406 by the first storage operation 404 and a second storage object change 458 of the second storage object 434 by the second storage operation 432 in the third replication workflow 462. The third replication workflow 462 may be transferred to the second storage cluster 414 for selective implementation 460 of the first storage object change 456 and/or the second storage object change 458 (e.g., the second storage cluster 414 may merely implement to second storage object change 458 but not the first storage object change 456).

Figure 4D:
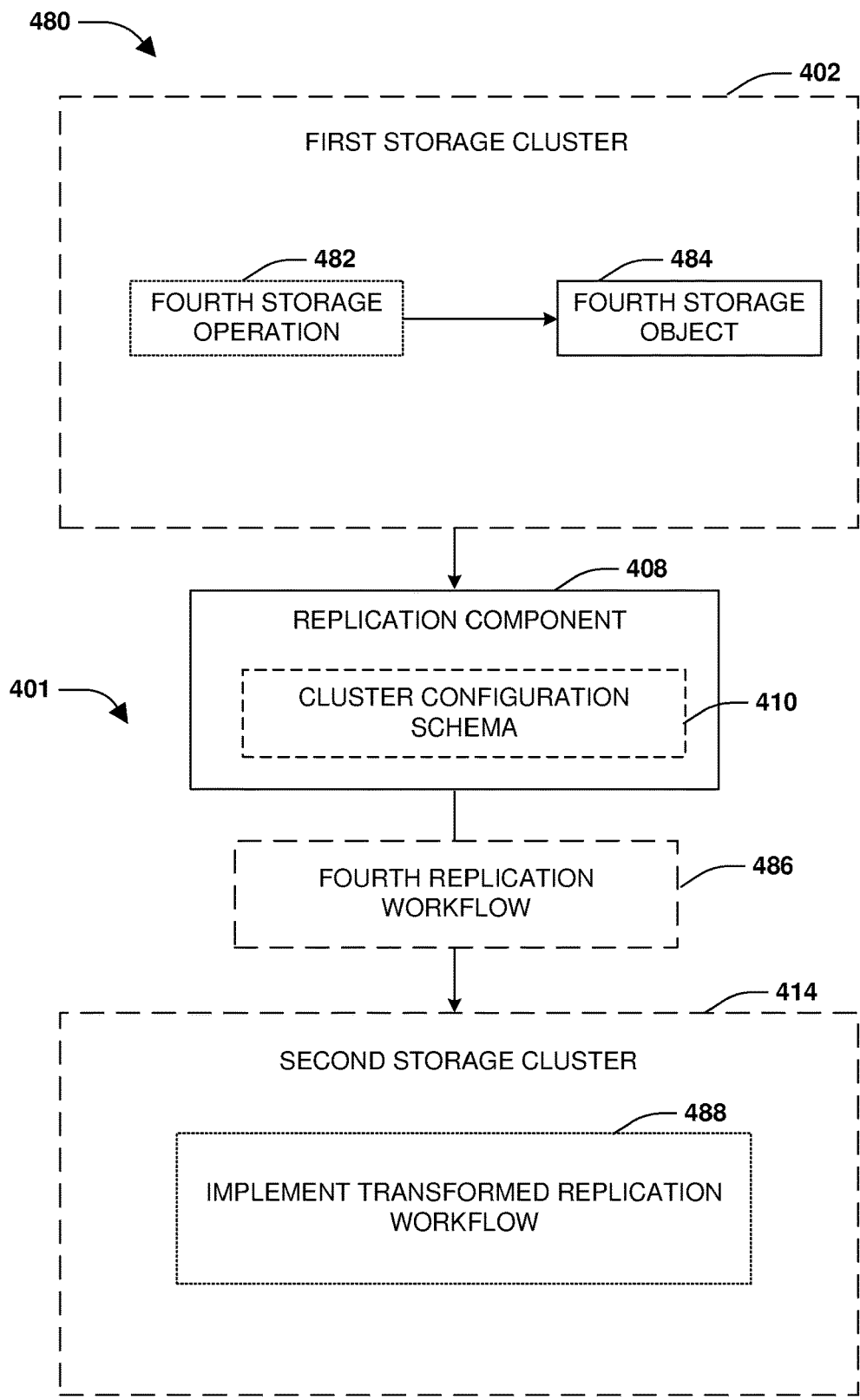
FIG. 4D is a component block diagram illustrating an exemplary system for cluster configuration information replication using a fourth replication workflow.

FIG. 4D illustrates an example 480 of the second storage cluster 414 implementing 488 a transformed replication workflow. For example, the cluster configuration schema 410 may specify that a fourth storage operation 482 (e.g., a create new volume operation) is to be monitored. Responsive to the fourth storage operation 482 being performed to create a fourth storage object 484 (e.g., a new volume having a volume name characteristic "Test Volume", a directory characteristic "/temp", and/or other characteristics), the replication component 408 may generate a fourth replication workflow 486 for the fourth storage operation 482. The replication component 408 may transfer the fourth replication workflow 486 to the second storage cluster 414 for implementation 488. The second storage cluster 414 may transform the fourth replication workflow 486 to create the transformed replication workflow. For example, the volume name characteristic "Test Volume" may be transformed to a transformed volume name characteristic "Testing 123" and the directory characteristic "/temp" may be transformed to a transformed directory characteristic "/working" for inclusion within the transformed replication workflow. In this way, the transformed replication workflow may be implemented by the second storage controller 414.

Figure 5:
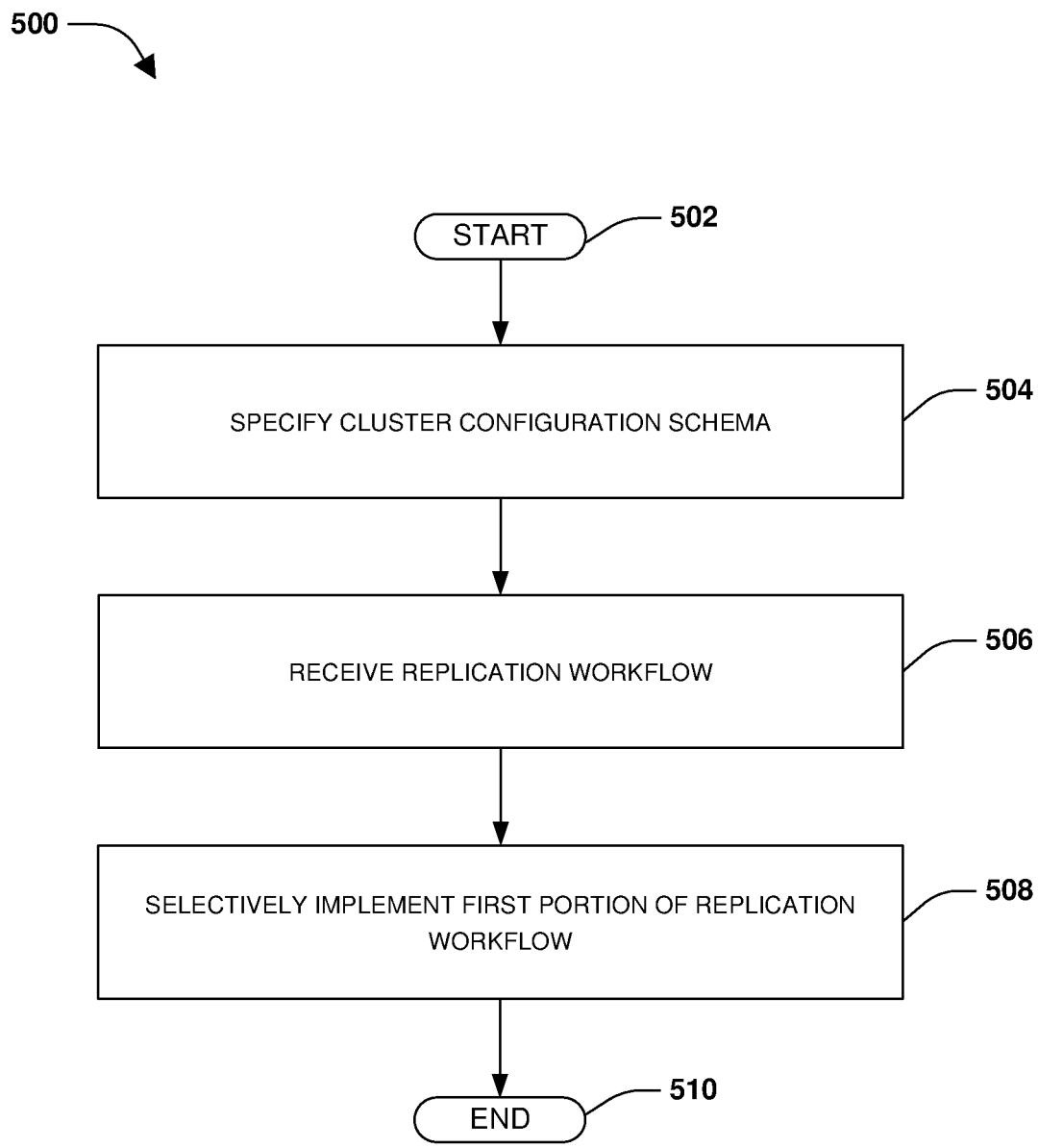
FIG. 5 is a flow chart illustrating an exemplary method of cluster configuration information replication.

One embodiment of cluster configuration information replication is illustrated by an exemplary method 500 of FIG. 5. At 504, a cluster configuration schema may be specified, such as by a second storage cluster that is to receive replicated cluster configuration information from a first storage cluster in the form of replication workflows. The cluster configuration schema may define storage objects, of the first storage cluster, that are to be actively monitored for change resulting from storage operations (e.g., a first storage object that is to be actively monitored for change resulting from a first storage operation, such as a volume that is to be monitored for resize operations, rename operations, etc.). At 506, the second storage cluster may receive a replication workflow indicating that the first storage operation was implemented for the first storage object (e.g., the volume may have been resized to a new size and renamed to a new name). In an example, the replication workflow may comprise a set of storage information, such as a first portion corresponding to the new size resulting from the resize operation and a second portion corresponding to the new name resulting from the renaming operation. At 508, the first portion of the replication workflow may be selectively implemented on the second storage cluster. For example, the resize operation may be implemented for a replicated volume of the second storage cluster. In an example, the second storage cluster may selectively not implement the second portion by disqualifying the new name due to the new name violating a naming policy of the second storage cluster. In this way, portions of storage information, within the replication workflow, may be selectively implemented or disqualified by the second storage controller. At 510, the method ends.

Figure 6:
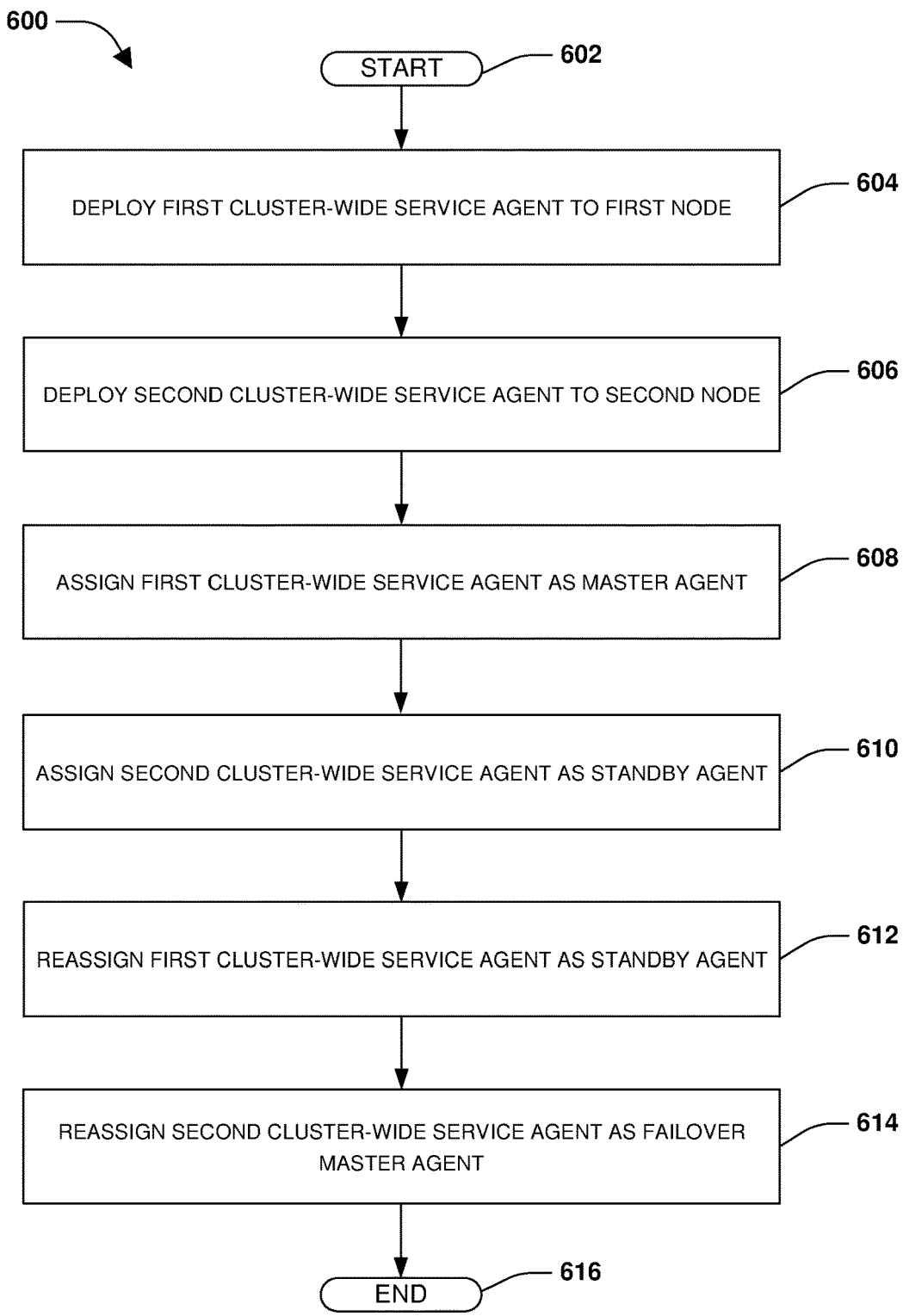
FIG. 6 is a flow chart illustrating an exemplary method of managing cluster-wide service agents.

One embodiment of managing cluster-wide service agents is illustrated by an exemplary method 600 of FIG. 6. A cluster storage environment may comprise a plurality of nodes (e.g., storage controllers) that manage storage (e.g., provide clients with access to user data stored on a volume), which may involve user data (e.g., a text file stored by a client on a storage device) and cluster configuration information (e.g., a size, name, and location of the volume). Cluster-wide service agents may be deployed to respective nodes within the cluster storage environment (e.g., one cluster-wide service agent per node). In an example, a master policy may be enforced for the cluster-wide service agents (e.g., a single master policy specifying that merely 1 cluster-wide service agent is to be a master agent at any given time; a master policy specifying that less than all cluster-wide service agents are to be a master agent at any given time; etc.). A cluster-wide service agent that is assigned as a master agent may be configured to actively process cluster service calls (e.g., API calls for a set of storage cluster services, such as a backup cluster service, a replication cluster service, a policy cluster service, a volume creation cluster service, etc., managed by the master agent).

At 604, a first cluster-wide service agent may be deployed to a first node within the cluster storage environment. At 606, a second cluster-wide service agent may be deployed to a second node within the cluster storage environment. In an example, the first cluster-wide service agent may comprise a first physical process configured to actively process API calls for the set of storage cluster services while having a master agent assignment. The second cluster-wide service agent may comprise a second physical process (e.g., a second instance of the first physical process) configured to actively process API calls for the set of storage cluster services while having the master agent assignment.

At 608, the first cluster-wide service agent may be assigned as the master agent configured to actively process cluster service calls. In an example, a first set of operational statistics for the first cluster-wide service agent (e.g., historical response time to API calls, historical downtime of unavailability, etc.) may be evaluated against a second set of operational statistics for the second cluster-wide service agent to award a cluster-wide service agent, such as the first cluster-wide service agent, as the master agent (e.g., the second cluster-wide service agent may have historically slow response times for servicing API calls in comparison with the first cluster-wide service agent). Because the master agent may experience a failure at some point, a sync point may be defined for the master agent so that the master agent synchronizes cluster service call processing information that may be used by a cluster-wide service agent that may takeover for the master agent as a failover master agent. In an example, a storage cluster service data cache may be maintained for use by the master agent. A first IP address of the first cluster-wide service agent, as the master agent, may be assigned to the storage cluster service data cache. In this way, the master agent may store/cache cluster service call processing data within the storage cluster service data cache.

At 610, the second cluster-wide service agent may be assigned as a standby agent configured to passively wait for reassignment as a failover master agent (e.g., the failover master agent may be a master agent that takes over for a failed master agent). In an example, an interface may be exposed to the first cluster-wide service agent and/or the second cluster-wide service agent. The interface may comprise an initialization interface, a shutdown interface, an acquire master duties interface, a release master duties interface, etc. The interface may be exposed according to an asynchronous and/or idempotent implementation. In this way, the first cluster-wide service agent and/or the second cluster-wide service agent may perform various functionality using the interface (e.g., the first cluster-wide service agent may release master duties using the release master duties interface).

A failure of the master agent may be detected. In an example, the first node may fail. In another example, the first cluster-wide service agent may not be responding or providing a heartbeat. In another example, the failure may be identified based upon a first set of operational statistics for the first cluster-wide service agent indicating that the first cluster-wide service agent is not satisfying a performance criteria (e.g., a relatively slow response time for servicing cluster service calls). At 612, responsive to the failure, the first cluster-wide service agent may be reassigned as the standby agent. At 614, the second cluster-wide service agent may be reassigned as the failover master agent configured to actively process cluster service calls based upon the failure. In an example, the second cluster-wide service agent may be automatically assigned as the failover master agent in real-time based upon a service interruption tolerance metric in order to mitigate service interruption of cluster service calls.

In an example, the storage cluster service data cache may be purged to remove the first IP address from the storage cluster service data cache. A second IP address of the second cluster-wide service agent may be assigned to the storage cluster service data cache. The service cluster service data cache may be maintained for use by the second cluster-wide service agent as the failover master agent. In an example, inter process remote procedure calls may be retargeted to the failover master agent based upon the assignment of the second IP address to the storage cluster service data cache so that the second cluster-wide service agent can process cluster service calls as the failover master agent. Inter process remote procedure calls may be retargeted according to an original network configuration of the cluster storage environment before the failure of the master agent (e.g., the second cluster-wide service agent can start processing cluster service calls without changing a network configuration of the cluster storage environment). In an example, the second cluster-wide service agent, as the failover master agent, may be instructed to perform a clean-up of prior cluster service call processing that was in progress by the first cluster-wide service agent before the failure. In this way, cluster-wide service agents may be managed for the cluster storage environment. At 616, the method ends.

Figure 7A:
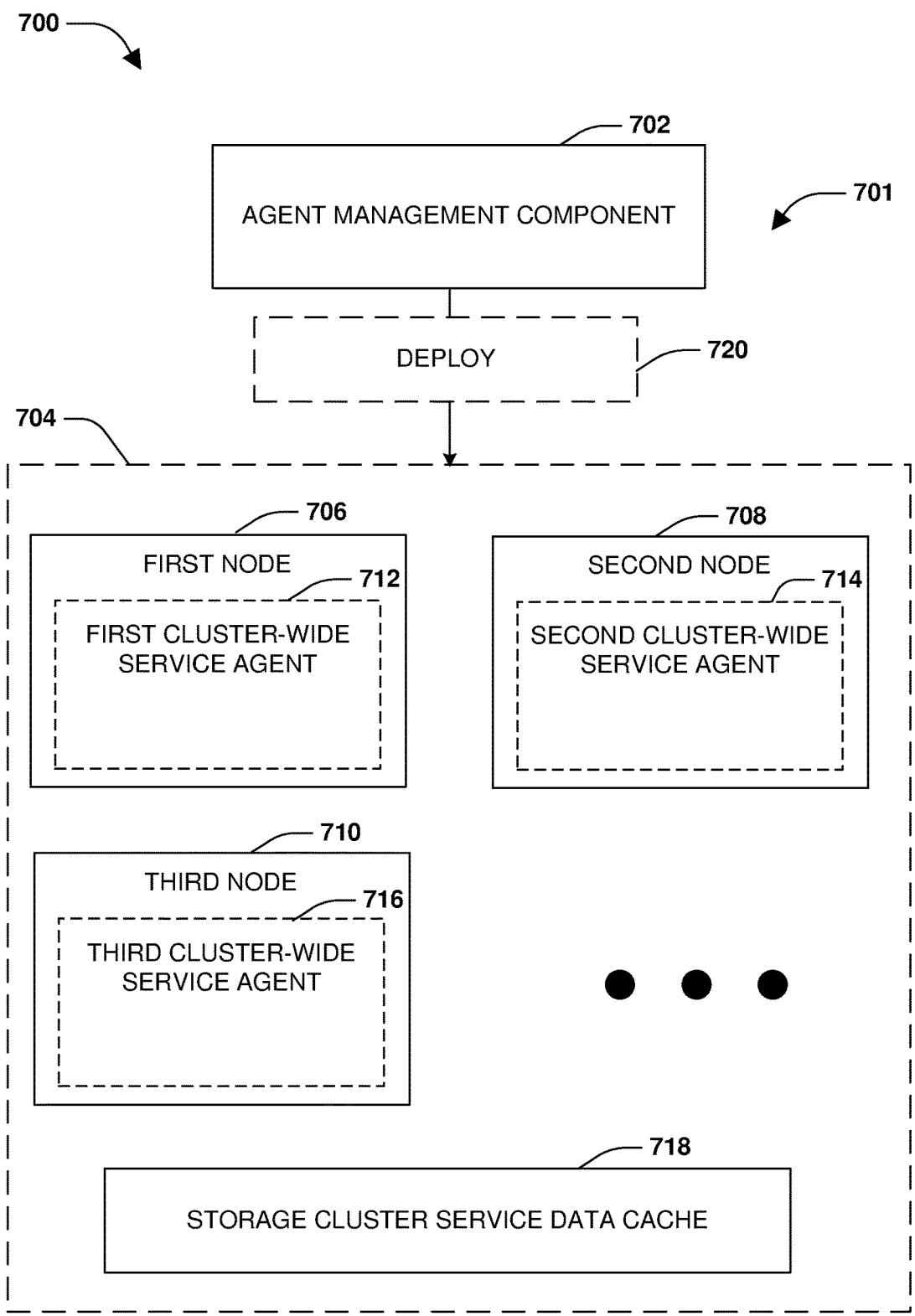
FIG. 7A is a component block diagram illustrating an exemplary system for managing cluster-wide service agents, where one or more cluster-wide service agents are deployed.

FIGS. 7A-7D illustrate examples of a system 701, comprising an agent management component 702, for managing cluster-wide service agents. FIG. 7A illustrates an example 700 of the agent management component 702 being associated with a cluster storage environment 704 comprising a first node 706, a second node 708, a third node 710, and/or other nodes not illustrated. The agent management component 702 may deploy 720 cluster-wide service agents to such nodes, such as a first cluster-wide service agent 712 to the first node 706 (e.g., a first physical process executing on the first node 706), a second cluster-wide service agent 714 to the second node 708 (e.g., a second physical process executing on the second node 708), a third cluster-wide service agent 716 to the third node 710 (e.g., a third physical process executing on the third node 710), etc. The agent management component 702 may maintain a storage cluster service data cache 718 that may be used by a master agent for processing cluster service calls (e.g., API calls to a policy cluster service, a backup cluster service, a volume creation cluster service, etc.).

Figure 7B:
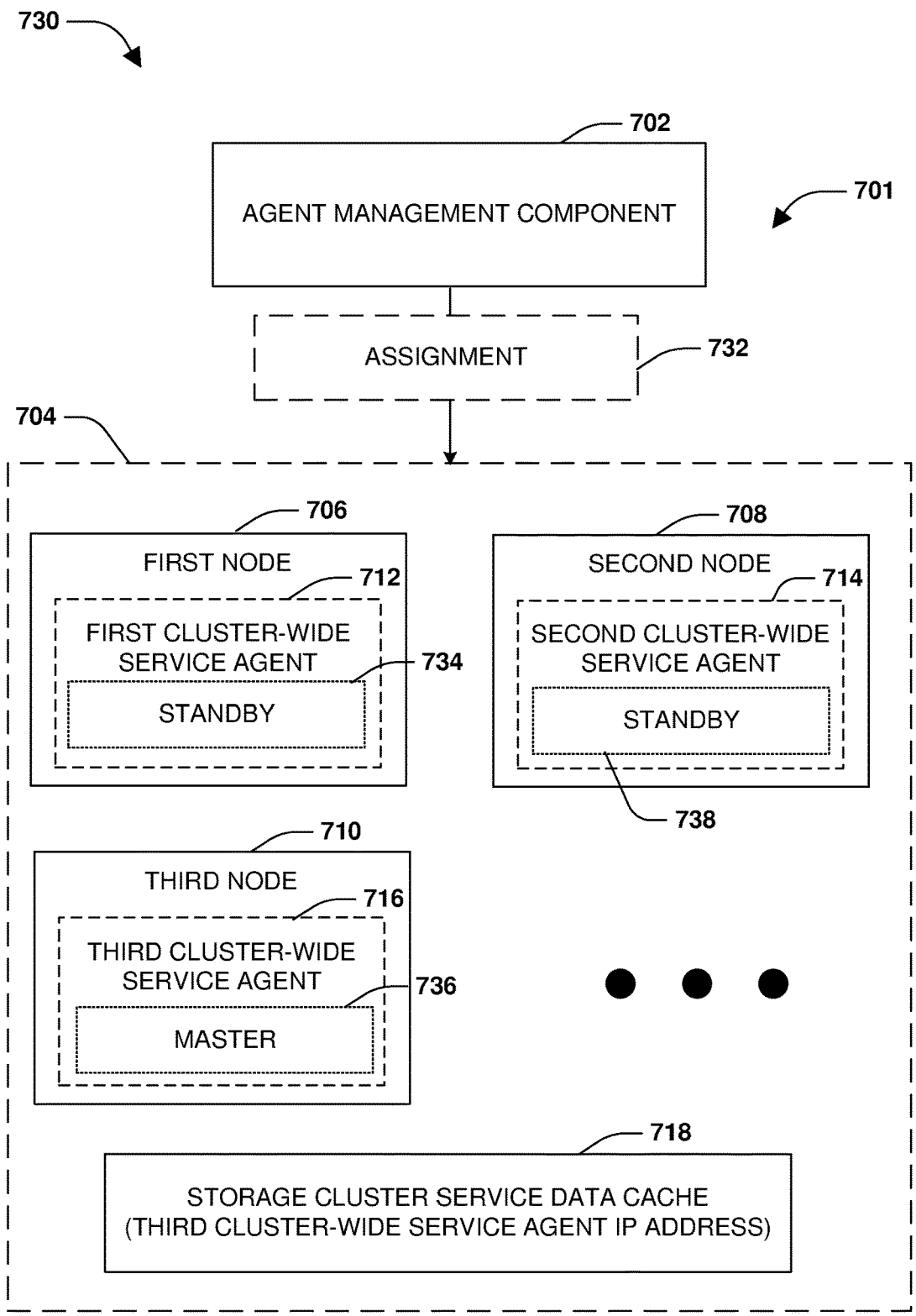
FIG. 7B is a component block diagram illustrating an exemplary system for managing cluster-wide service agents, where cluster-wide service agents are assigned as either master agents or standby agents.

FIG. 7B illustrates an example 730 of the agent management component 702 assigning 732 cluster-wide service agents as either standby agents or master agents. It may be appreciated that any number or percentage of cluster-wide service agents may be assigned as master agents, and that assigning a single cluster-wide service agent as a master agent is merely an example (e.g., having a single master agent may mitigate resource usage and/or complexity that may otherwise have been devoted to load balancing between multiple master agents, while still providing high availability of cluster service access through the single master agent because a standby agent may be reassigned as a failover master agent in real-time to mitigate downtime of client access to cluster services). In an example, the first cluster-wide service agent 712 may be assigned as a first standby agent 734, the second cluster-wide service agent 714 may be assigned as a second standby agent 738, and the third cluster-wide service agent 716 may be assigned as a master agent 736. A standby agent may be configured to passively wait for reassignment as a failover master agent. The master agent 736 may be configured to actively process cluster service calls. A third cluster-wide service agent IP address, of the third cluster-wide service agent 716, may be assigned to the storage cluster service data cache 718 so that the third cluster-wide service agent 716 may utilize the storage cluster service data cache 718 for processing cluster service calls.

Figure 7C:
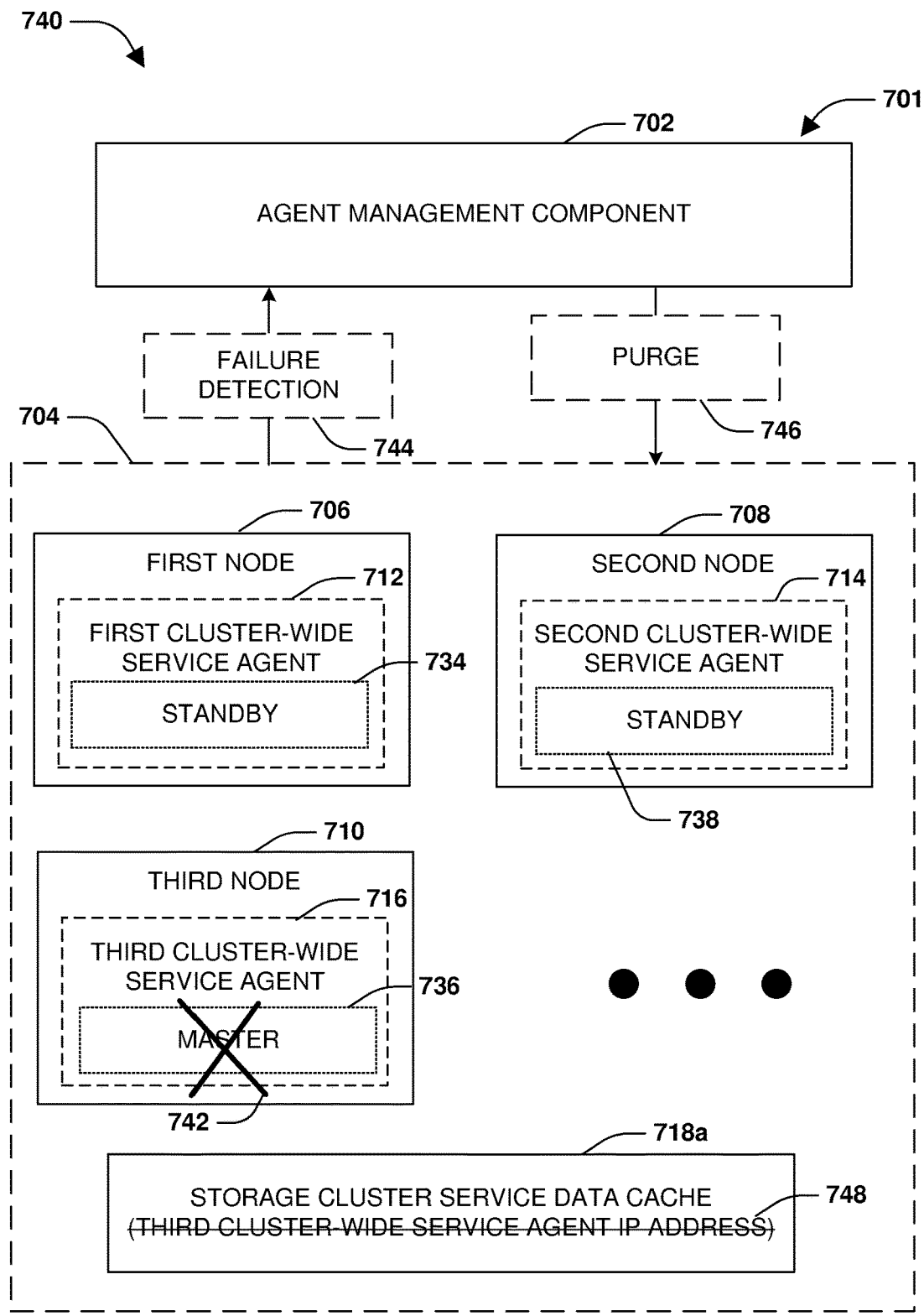
FIG. 7C is a component block diagram illustrating an exemplary system for managing cluster-wide service agents, where a master agent fails.

FIG. 7C illustrates an example 740 of the agent management component 702 detecting 744 a failure 742 of the master agent 736. For example, the third node 710 may crash, resulting in the failure 742 of the third cluster-wide service agent 716 as the master agent 736. The agent management component 702 may purge 746 the storage cluster service data cache to remove the third cluster-wide service agent IP address 748 based upon the failure 742 of the master agent 736, resulting in a purged storage cluster service data cache 718a that may be ready for use by a failover master agent.

Figure 7D:
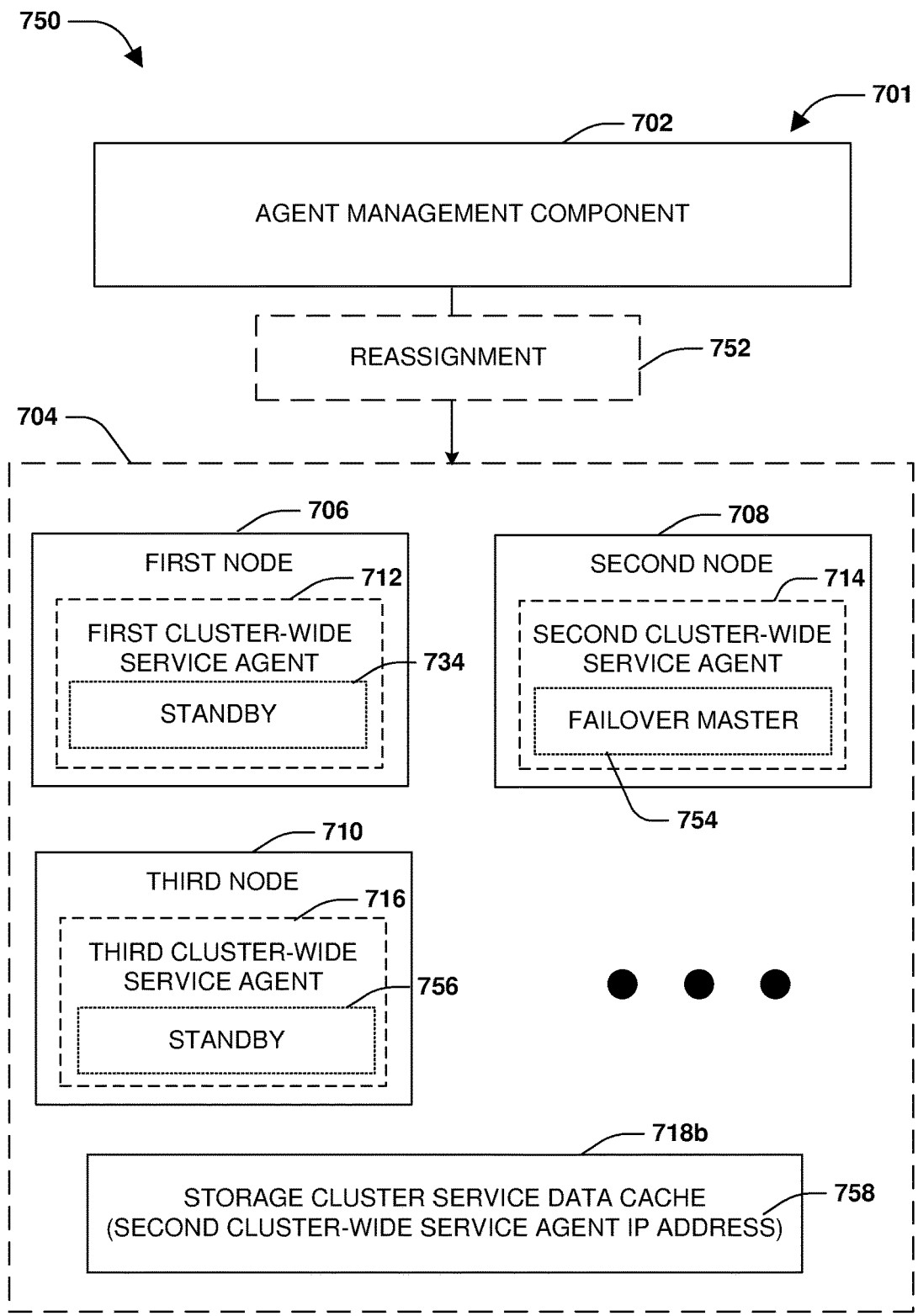
FIG. 7D is a component block diagram illustrating an exemplary system for managing cluster-wide service agents, where a cluster-wide service agent is reassigned as a failover master.

FIG. 7D illustrates an example 750 of the agent management component 702 performing a reassignment 752 based upon the failure 742 (e.g., example 740 of FIG. 7C). For example, the agent management component 702 may assign the third cluster-wide service agent 716 as a third standby agent 756 (e.g., during and/or after the failure 742). The agent management component 702 may evaluate a first set of operational statistics for the first cluster-wide service agent 712 (e.g., historical response times to cluster service calls, historical downtime or unavailability, operational characteristics of the first node 706, available resources of the first node 706, etc.) against a second set of operational statistics for the second cluster-wide service agent 714 (e.g., historical response times to cluster service calls, historical downtime or unavailability, operational characteristics of the second node 708, available resources of the second node 708, etc.) to determine which cluster-wide service agent should be awarded as a failover master. For example, the second cluster-wide service agent 714 may have desired operational statistics compared to the first cluster-wide service agent 712, and thus the second cluster-wide service agent 714 may be awarded as a failover master 754 configured to actively process cluster service calls. In an example, the reassignment 752 of the second cluster-wide service agent 714 from the second standby agent 738 to the failover master 754 may be performed in real-time based upon a service interruption tolerance metric to mitigate service interruption of cluster service calls (e.g., a zero or close to zero tolerance for interruptions in processing cluster service calls). A second cluster-wide service agent IP address 758 of the second cluster-wide service agent 714 may be assigned to the purged storage cluster service data cache 718a, resulting in a restored storage cluster service data cache 718b that may be used by the failover master 754 to actively process cluster service calls.

Figure 8:
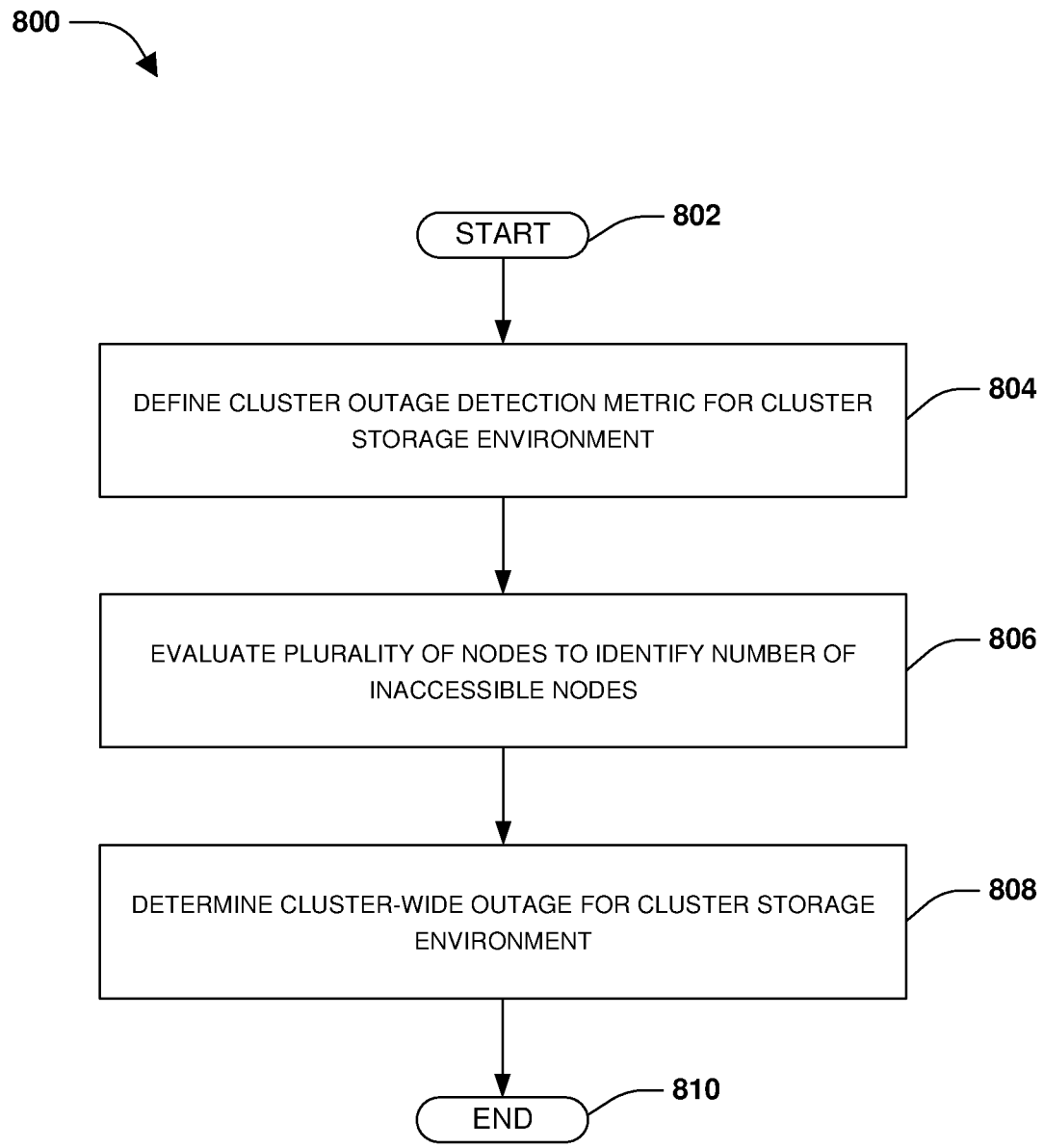
FIG. 8 is a flow chart illustrating an exemplary method of cluster-wide outage detection.

One embodiment of cluster-wide outage detection is illustrated by an exemplary method 800 of FIG. 8. A storage cluster environment may comprise a plurality of nodes (e.g., storage controllers) configured to manage storage, such as by providing clients with access to user data stored on storage devices and/or by implementing various storage policies (e.g., a backup policy, a caching policy, etc.). At 804, a cluster outage detection metric may be defined for the cluster storage environment. In an example, the cluster outage detection metric may specify that a cluster-wide outage occurs when a majority of nodes are inaccessible. It may be appreciated that the cluster outage detection metric may specify a variety of criteria and/or situations that may be deemed as a cluster-wide outage resulting in the storage cluster environment becoming inaccessible (e.g., a threshold percentage of inaccessible nodes; a number of concurrently rebooting nodes; etc.).

At 806, the plurality of nodes may be evaluated to identify a number of inaccessible nodes (e.g., a node that may not be currently capable of processing cluster service calls and/or performing storage functionality such as providing clients with access to user data of the cluster storage environment) within the cluster storage environment. In an example, a node may be identified as inaccessible based upon a power cycle of the cluster storage environment. In another example, a node may be identified as inaccessible based upon a halt and reboot sequence of the node. In another example, a node may be identified as inaccessible based upon a kernel panic of the node. In another example, a node may be identified as inaccessible based upon a failure resulting in a halt of the node. In an example, cluster reboot detection may be performed to identify inaccessible nodes during a node reboot sequence after an outage. For example, the node reboot sequence may correspond to a number of nodes exceeding the cluster outage detection metric (e.g., a majority of nodes) concurrently rebooting.

At 808, responsive to the number of inaccessible nodes satisfying the cluster outage detection metric (e.g., a majority of nodes may be inaccessible), a cluster-wide outage may be determined for the cluster storage environment. In an example, a node reboot, indicative of a cluster level outage, may be distinguished from a service reboot and/or an application reboot that are indicative of a service level outage. The cluster level outage may be indicative of inaccessibility of the cluster storage environment, whereas the service level outage may merely correspond to inaccessibility of one or more nodes that results in a loss of access to an application or service provided by such nodes (e.g., inaccessibility to a backup policy service, a migration service, a volume creation service, a LUN renaming service, a storage application, etc.). In an example, node quorum logic for the cluster storage environment may be used to determine the cluster-wide outage. A first cluster-wide outage entry may be stored in a cluster storage structure (e.g., a database). A sequence number (e.g., a unique identifier for the cluster-wide outage) may be assigned to the first cluster-wide outage entry. The sequence number may be different than sequence numbers assigned to other cluster-wide outage entries (e.g., uniquely identifying other previously identified cluster-wide outages) within the cluster storage structure. In an example, a cluster outage duration for the cluster-wide outage may be specified, such as within the first cluster-wide outage entry. Various decisions may be made based upon the cluster-wide outage. For example, a determination as whether to retain a primary virtual server in a down state or bring the primary virtual server into an online state may be made based upon the cluster-wide outage. At 810, the method ends.

Figure 9A:
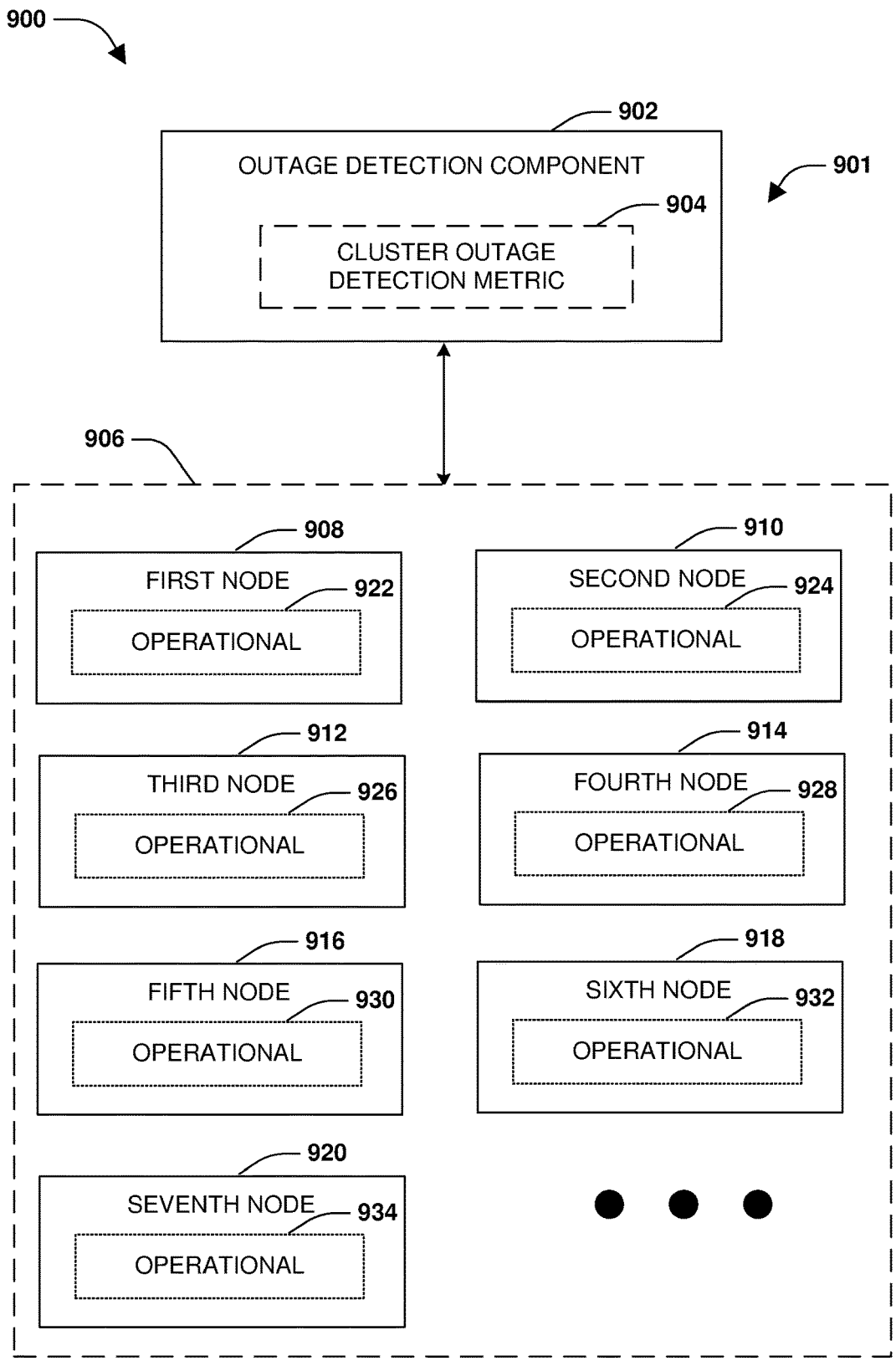
FIG. 9A is a component block diagram illustrating an exemplary system for cluster-wide outage detection.
Figure 9B:
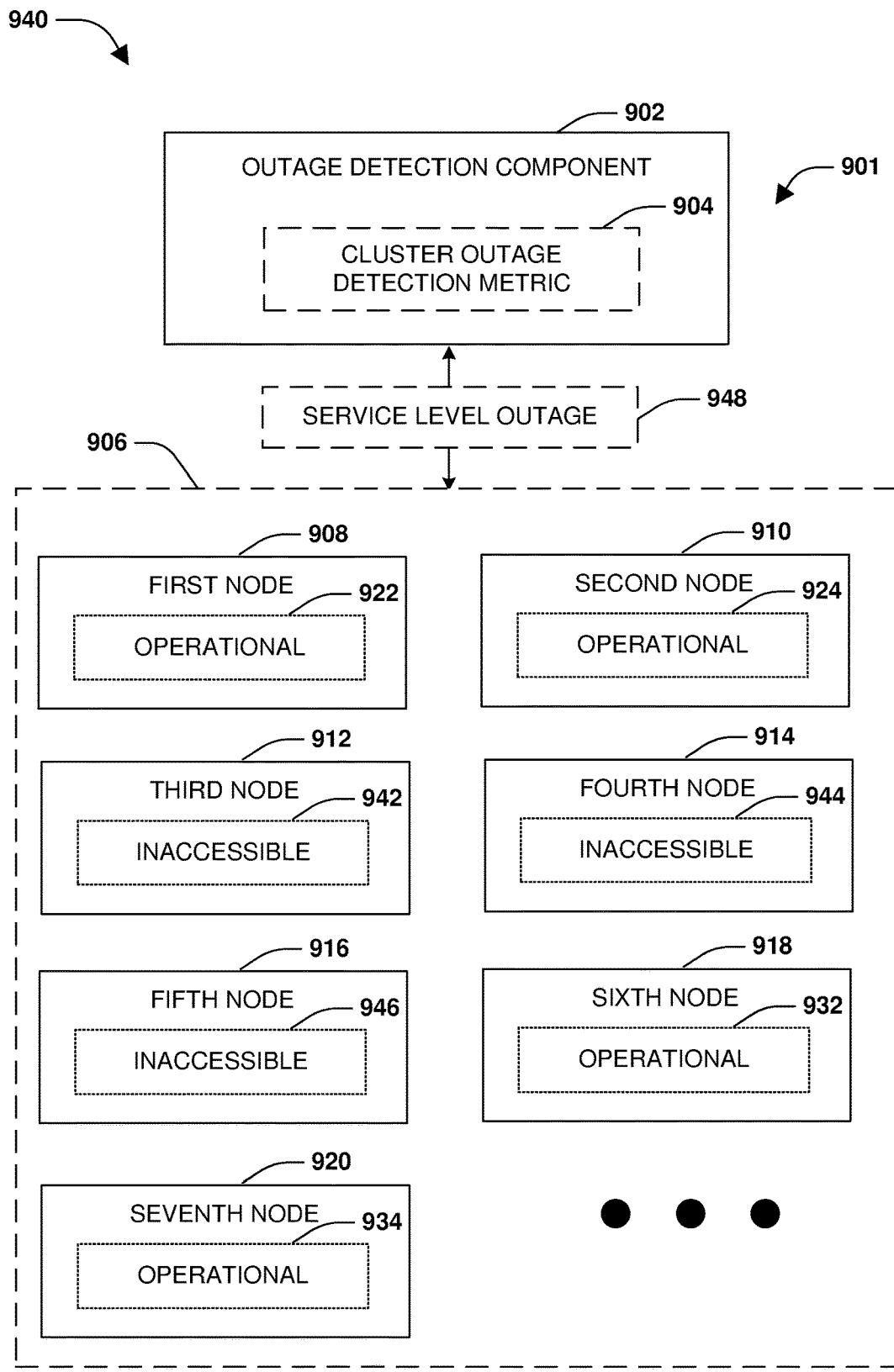
FIG. 9B is a component block diagram illustrating an exemplary system for cluster-wide outage detection, where a service level outage is detected.
Figure 9C:
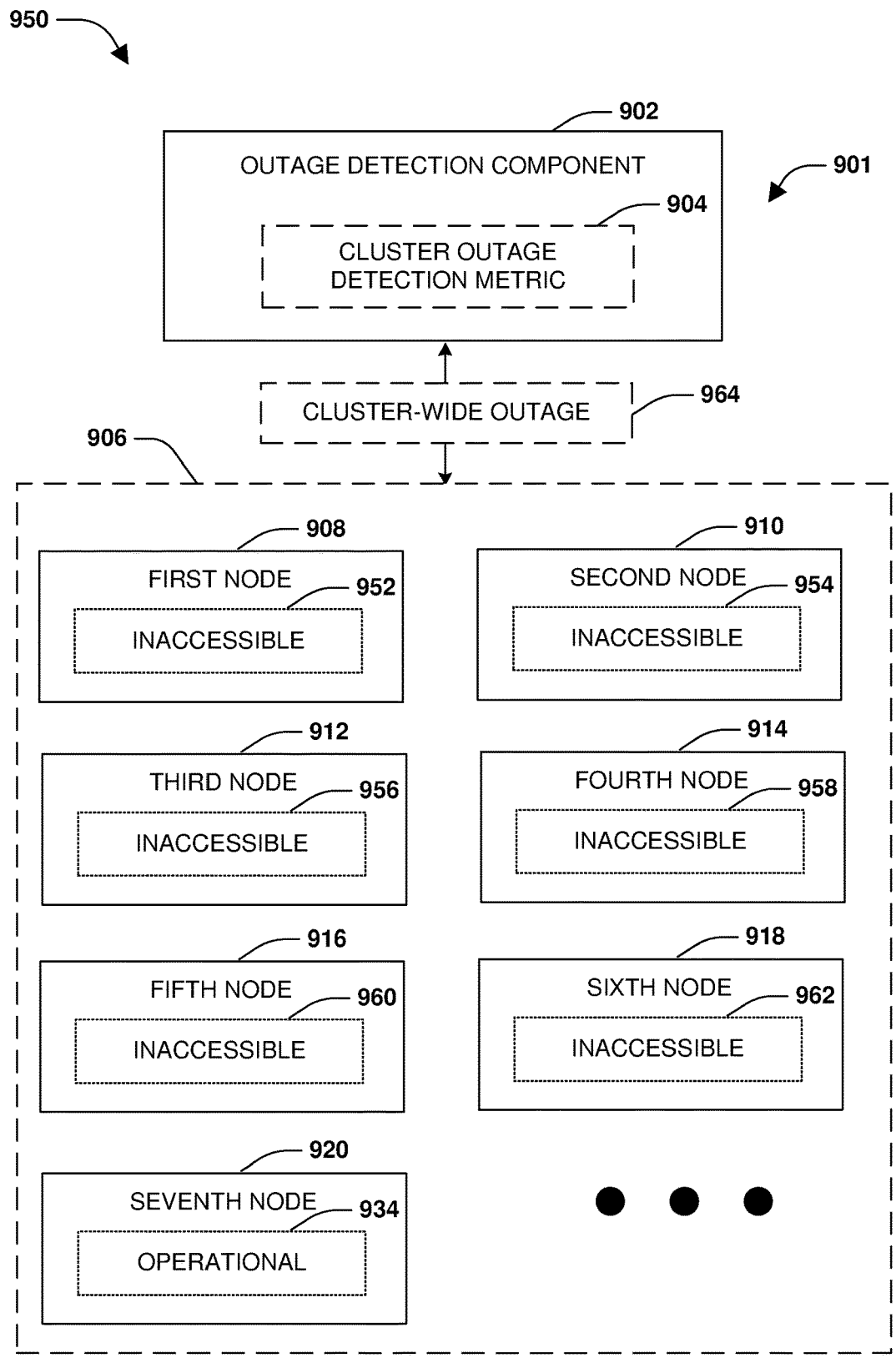
FIG. 9C is a component block diagram illustrating an exemplary system for cluster-wide outage detection, where a cluster-wide outage is detected.

FIGS. 9A-9C illustrate examples of a system 910, comprising an outage detection component 902, for cluster-wide outage detection. FIG. 9A illustrates an example 900 of the outage detection component 902 being associated with a cluster storage environment 906. The cluster storage environment 906 may comprise a first node 908, a second node 910, a third node 912, a fourth node 914, a fifth node 916, a sixth node 918, a seventh node 920, and/or other nodes not illustrated. The outage detection component 902 may define a cluster outage detection metric 904 for the cluster storage environment 906. The cluster outage detection metric 904 may specify that a cluster-wide outage (e.g., inaccessibility of the cluster storage environment 906) occurs for the cluster storage environment 906 when a threshold percentage of nodes (e.g., a majority of nodes) are inaccessible (e.g., not responding, rebooting, failed, halted, etc.), otherwise merely a service level outage may be detected (e.g., an inaccessibility of one or more nodes that results in a loss of access to an application or service provided by such nodes). In an example, no cluster-wide outage may be detected because a number of inaccessible nodes does not satisfy the cluster outage detection metric, such as because the first node 908 is operational 922, the second node 910 is operation 924, the third node 912 is operational 926, the fourth node 914 is operational 928, the fifth node 916 is operational 930, the sixth node 918 is operational 932, and the seventh node 920 is operational 934.

FIG. 9B illustrates an example 940 of the outage detection component 902 identifying a service level outage 948 associated with the cluster storage environment 906. For example, the outage detection component 902 may determine that the third node 912 has become inaccessible 942, the fourth node 914 has become inaccessible 944, and the fifth node 916 has become inaccessible 946. The outage detection component 902 may determine that the inaccessibility of the third node 912, the fourth node 914, and the fifth node 916 does not satisfy the cluster outage detection metric 904 (e.g., less than a majority of nodes may be inaccessible). Instead, the outage detection component 902 may identify the service level outage 948 (e.g., an inaccessibility for clients to access a cluster service and/or an application hosted by the third node 912, the fourth node 914, and the fifth node 916).

FIG. 9C illustrates an example 950 of the outage detection component 902 identifying a cluster-wide outage 964. For example, the outage detection component 902 may determine that the first node 908 has become inaccessible 952, the second node 910 has become inaccessible 954, the third node 912 has become inaccessible 956, the fourth node 914 has become inaccessible 958, the fifth node 916 has become inaccessible 960, and the sixth node 918 has become inaccessible 962. The outage detection component 902 may determine that the inaccessibility of the first node 908, the second node 910, the third node 912, the fourth node 914, the fifth node 916, and the sixth node 918 satisfies the cluster outage detection metric 904 (e.g., more than a majority of nodes may be inaccessible), and thus the outage detection component 902 may identify the cluster-wide outage 964 (e.g., the cluster storage environment 906 may be inaccessible due to the outage notwithstanding the operational state 934 of the seventh node 920). Various decisions may be made based upon the cluster-wide outage (e.g., whether to retain a primary virtual server in a down state or bring the primary virtual server into an online state; whether to implement a cluster restoration operation; whether to synchronize cluster configuration data of the cluster storage environment 906 with a failover cluster storage environment that provided failover operation on behalf of the cluster storage environment 906 during the failure).

Figure 10:
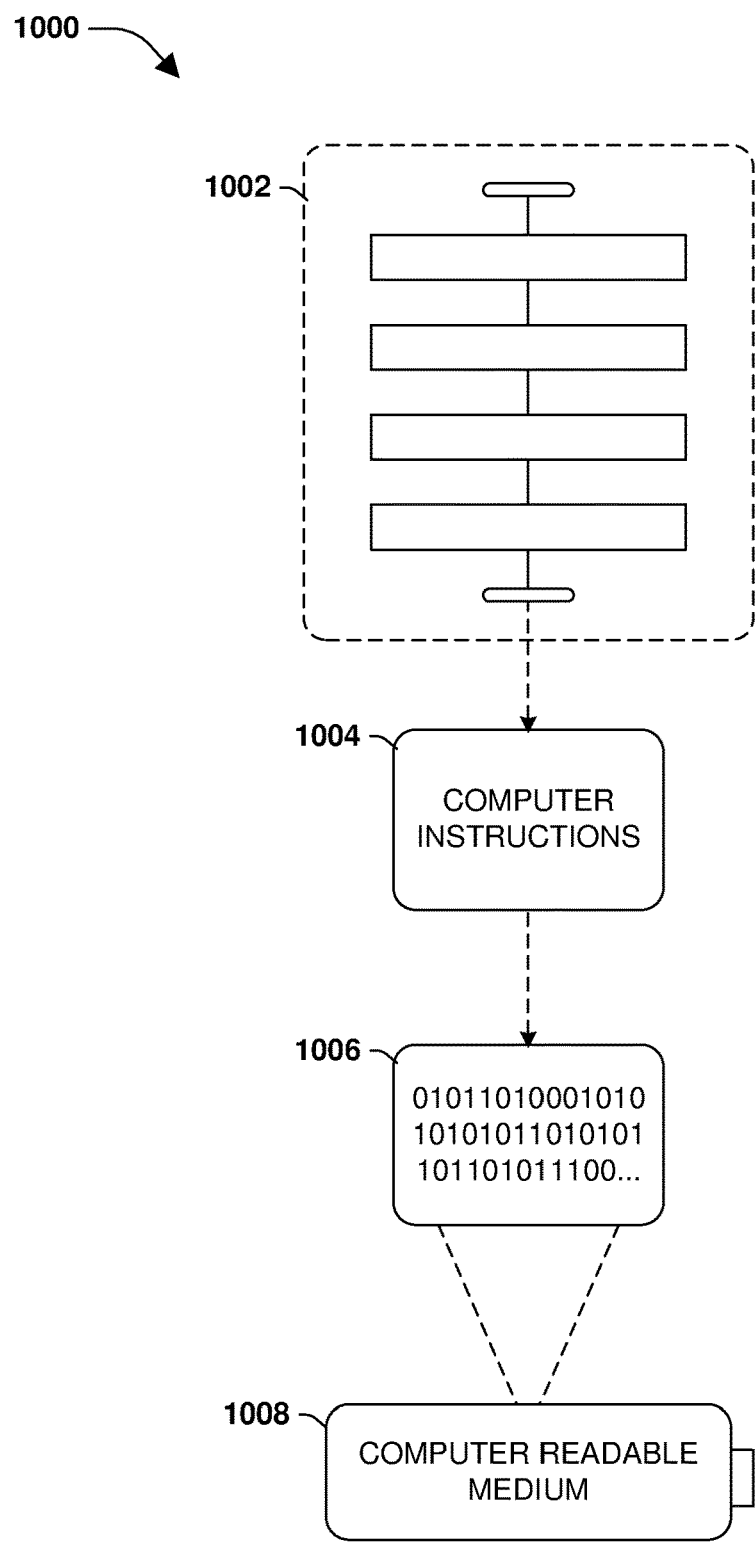
FIG. 10 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 10, wherein the implementation 1000 comprises a computer-readable medium 1008, such as a CD-ft DVD-R, flash drive, a platter of a hard disk drive, etc., on which is encoded computer-readable data 1006. This computer-readable data 1006, such as binary data comprising at least one of a zero or a one, in turn comprises a set of computer instructions 1004 configured to operate according to one or more of the principles set forth herein. In some embodiments, the processor-executable computer instructions 1004 are configured to perform a method 1002, such as at least some of the exemplary method 300 of FIG. 3, at least some of the exemplary method 500 of FIG. 5, at least some of the exemplary method 600 of FIG. 6, and/or at least some of the exemplary method 800 of FIG. 8, for example. In some embodiments, the processor-executable instructions 1004 are configured to implement a system, such as at least some of the exemplary system 401 of FIGS. 4A-4D, at least some of the exemplary system 701 of FIGS. 7A-7D, and/or at least some of the exemplary system 901 of FIGS. 9A-9C, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computing device, comprising:
   memory comprising machine executable code for performing a method; and
   a processor coupled to the memory, the processor configured to execute the machine executable code to cause the processor to:
      determine that a first operation was executed to modify a first object with a first modification and that a second operation was executed to modify a second object with a second modification, wherein a configuration defines that the first object and the second object, stored within a first cluster, are to be monitored for changes;
      identify a third operation implemented for a third object, wherein the configuration lacks a definition specifying that the third object is to be actively monitored for change by the third operation;
      generate a replication workflow to comprise configuration data used by a second cluster to replicate the first modification and the second modification from the first cluster to the second cluster; and
      transfer the replication workflow to the second cluster for execution to replicate the first modification and the second modification using the configuration data.

2. The computing device of claim 1, wherein the machine executable code causes the processor to:
   modify a characteristic of the first operation to create a modified characteristic for inclusion within the replication workflow.

3. The computing device of claim 1, wherein the machine executable code causes the processor to:
   maintain the configuration as a cluster configuration schema defining a replication domain as comprising the first object and the second object.

4. The computing device of claim 1, wherein the replication workflow comprises a set of storage information.

5. The computing device of claim 2, wherein the machine executable code causes the processor to:
   modify a volume name characteristic from a volume name used by the first cluster to a modified volume name used by the second cluster to create the modified characteristic.

6. The computing device of claim 2, wherein the modification to the characteristic comprises a volume size characteristic change.

7. The computing device of claim 4, wherein the machine executable code causes the processor to:
   facilitate selective implementation of a first portion of the set of storage information, but excluding a second portion of the set of storage information, of the replication workflow by the second cluster.

8. The computing device of claim 1, wherein the machine executable code causes the processor to:
   maintain the configuration as a cluster configuration schema defining that the first object and the second object are to be monitored for changes.

9. The computing device of claim 8, wherein the machine executable code causes the processor to:
   exclude a third modification by the third operation from inclusion within the replication workflow.

10. The computing device of claim 1, comprising:
    disqualify the third operation for inclusion within the replication workflow.

11. The computing device of claim 1, the replication workflow associated with a set of objects, and the replication workflow comprising a baseline workflow for the set of objects.

12. The computing device of claim 1, wherein the machine executable code causes the processor to:
    invoke, based upon the first cluster having a disaster, the second cluster to operate according to a disaster recovery mode in place of the first cluster.

13. The computing device of claim 12, wherein the machine executable code causes the processor to:
    transfer a switchback replication workflow, generated based upon the second cluster operating according to the disaster recovery mode, to the first cluster for switchback operation from the second cluster to the first cluster upon disaster recovery of the first cluster.

14. The computing device of claim 3, the cluster configuration schema comprising a hierarchical collection of objects and operations available to perform upon the objects that result in a change to a cluster configuration of the first cluster.

15. The computing device of claim 3, the cluster configuration schema specifying a set of object characteristics and a set of operations for the first object that are to be captured for inclusion within the replication workflow.

16. The computing device of claim 3, the cluster configuration schema defining semantics of the first operation.

17. A method for cluster configuration information replication, comprising:
  determining that a first operation was executed to modify a first object with a first modification and that a second operation was executed to modify a second object with a second modification, wherein a configuration defines that the first object and the second object, stored within a first cluster, are to be monitored for changes;
  identifying a third operation implemented for a third object, wherein the configuration lacks a definition specifying that the third object is to be actively monitored for change by the third operation;
  generating a replication workflow to comprise configuration data used by a second cluster to replicate the first modification and the second modification from the first cluster to the second cluster; and
  transferring the replication workflow to the second cluster for execution to replicate the first modification and the second modification using the configuration data.

18. The method of claim 17, the replication workflow comprising a set of storage information, and the method comprising:
  facilitating selective implementation of a first portion of the set of storage information, but excluding a second portion of the set of storage information, of the replication workflow by the second cluster.

19. The method of claim 17, comprising:
  applying a policy change to a characteristic of the first operation to create a modified characteristic for inclusion within the replication workflow.

20. A non-transitory computer readable medium comprising instructions for performing a method, which when executed by a machine, causes the machine to:
  determine that a first operation was executed to modify a first object with a first modification and that a second operation was executed to modify a second object with a second modification, wherein a configuration defines that the first object and the second object, stored within a first cluster, are to be monitored for changes;
  identify a third operation implemented for a third object, wherein the configuration lacks a definition specifying that the third object is to be actively monitored for change by the third operation;
  generate a replication workflow to comprise configuration data used by a second cluster to replicate the first modification and the second modification from the first cluster to the second cluster; and
  transfer the replication workflow to the second cluster for execution to replicate the first modification and the second modification using the configuration data.

* * * * *